United States Patent
Michalscheck et al.

(10) Patent No.: US 10,950,051 B2
(45) Date of Patent: Mar. 16, 2021

(54) SYSTEMS AND METHODS FOR PRESENTING AN AUGMENTED REALITY

(71) Applicant: Rockwell Automation Technologies, Inc., Mayfield Heights, OH (US)

(72) Inventors: Jimi R. Michalscheck, Racine, WI (US); Jessica L. Korpela, Milwaukee, WI (US); Kyle K. Reissner, Hudson, OH (US); David A. Vasko, Hartland, WI (US); Matthew W. Fordenwalt, Hudson, OH (US); John J. Jauquet, Milwaukee, WI (US); Matthew R. Ericsson, Lyndhurst, OH (US); Andrew Wilber, Franklin, WI (US); Kelly A. Michalscheck, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 86 days.

(21) Appl. No.: 14/788,557

(22) Filed: Jun. 30, 2015

(65) Prior Publication Data

US 2016/0284128 A1    Sep. 29, 2016

Related U.S. Application Data

(60) Provisional application No. 62/139,182, filed on Mar. 27, 2015.

(51) Int. Cl.
*G06T 19/00* (2011.01)
*G05B 19/409* (2006.01)
*G05B 23/02* (2006.01)

(52) U.S. Cl.
CPC .......... *G06T 19/006* (2013.01); *G05B 19/409* (2013.01); *G05B 23/0216* (2013.01);
(Continued)

(58) Field of Classification Search
CPC .. G06T 19/006; G05B 19/19; G05B 23/0283; G05B 2219/31318; G06F 19/00
See application file for complete search history.

(56) References Cited

U.S. PATENT DOCUMENTS

2006/0241792 A1    10/2006  Pretlove et al.
2008/0082185 A1*   4/2008   Hood ................. G05B 19/0426
                                                        700/83
(Continued)

FOREIGN PATENT DOCUMENTS

EP    2521109 A1    11/2012
EP    2801941 A1    11/2014
(Continued)

OTHER PUBLICATIONS

Extended EP Search Report for EP Application No. 16161837.6 dated Sep. 2, 2016; 8 Pages.
EP 16161837.6 Examination Report dated Apr. 23, 2019.

*Primary Examiner* — Barry Drennan
*Assistant Examiner* — Khoa Vu
(74) *Attorney, Agent, or Firm* — Fletcher Yoder, P.C.

(57) ABSTRACT

A first computing device in an industrial automation system may include an image sensor that captures a visual representation of a portion of a facility including a first industrial automation equipment as image data and a communication component that communicatively couples the first computing device to a second computing device via a communication network, in which the first computing device receives relevant information related to the first industrial automation equipment from the second computing device. The first computing may include a display component that displays a plurality of real objects that visually represent physical features in the portion of the facility based at least in part on the image data, in which the plurality of real objects include a first real object that visual represents physical features of
(Continued)

the first industrial automation equipment; and that displays a first virtual object superimposed on at least a portion of the plurality of real objects based at least in part on the relevant information.

20 Claims, 8 Drawing Sheets

(52) U.S. Cl.
CPC ............ *G05B 2219/32014* (2013.01); *G05B 2219/33286* (2013.01); *G05B 2219/36167* (2013.01)

(56) References Cited

U.S. PATENT DOCUMENTS

| | | | | |
|---|---|---|---|---|
| 2011/0115816 | A1* | 5/2011 | Brackney | H05B 47/10 345/629 |
| 2012/0206452 | A1* | 8/2012 | Geisner | H04S 7/304 345/419 |
| 2012/0242648 | A1* | 9/2012 | Baier | G05B 19/409 345/418 |
| 2012/0251996 | A1 | 10/2012 | Jung et al. | |
| 2013/0024542 | A1* | 1/2013 | Keller | G05B 19/0428 709/217 |
| 2013/0031202 | A1 | 1/2013 | Mick et al. | |
| 2013/0211546 | A1* | 8/2013 | Lawson | G05B 19/4185 700/9 |
| 2013/0214903 | A1 | 8/2013 | Kalous et al. | |
| 2013/0321245 | A1 | 12/2013 | Harper | |
| 2014/0327792 | A1* | 11/2014 | Mulloni | H04N 5/23296 348/211.8 |
| 2015/0193982 | A1* | 7/2015 | Mihelich | H04L 67/18 345/633 |
| 2015/0365794 | A1* | 12/2015 | Hardwick | H04W 4/021 455/457 |

FOREIGN PATENT DOCUMENTS

| | | |
|---|---|---|
| WO | 2013170871 | 11/2013 |
| WO | 2013170875 | 11/2013 |
| WO | 2014127836 A1 | 8/2014 |
| WO | 2015028978 A1 | 3/2015 |

* cited by examiner

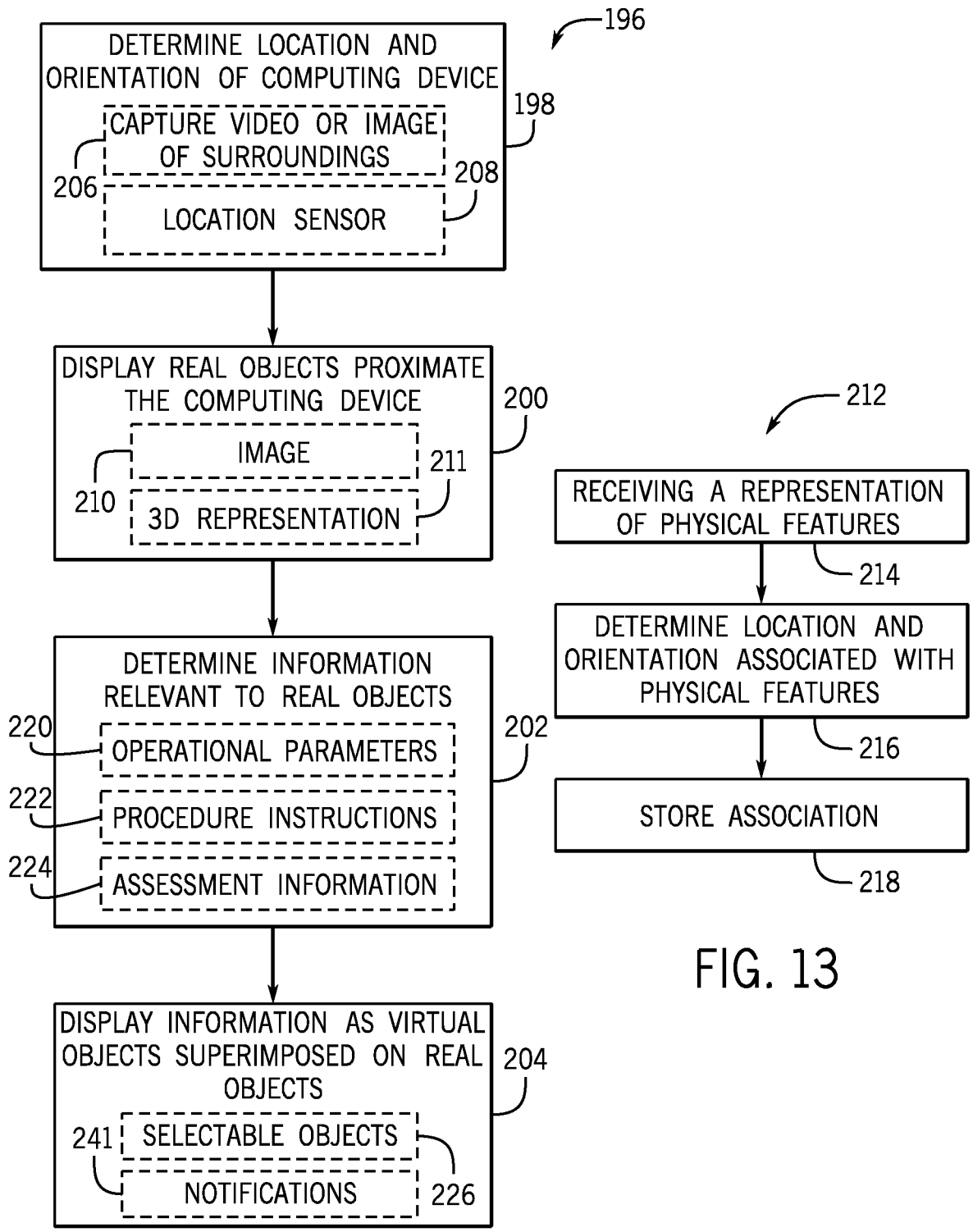

SYSTEMS AND METHODS FOR PRESENTING AN AUGMENTED REALITY

CROSS REFERENCE TO RELATED APPLICATIONS

This application claims priority from and the benefit of U.S. Provisional Application Ser. No. 62/139,182, entitled "Systems and Methods for Exchanging Information Between Devices in an Industrial Automation Environment," filed Mar. 27, 2015, which is hereby incorporated by reference in its entirety.

BACKGROUND

The present disclosure relates generally to industrial automation systems and communication of information within industrial automation systems. To facilitate performing various processes in a facility (e.g., a factory or plant), the industrial automation system may include automation equipment and may utilize a communication architecture that facilitates communication of information between automation equipment and/or with a user.

BRIEF DESCRIPTION

Generally, the present disclosure discusses numerous concepts regarding how devices in an industrial automation environment may exchange information with each other and use this shared information to assist users in the industrial automation environment to manage the operations and maintenance of the devices. In one embodiment, the devices in the industrial automation system may include a communication architecture that is structured according to a tri-partite paradigm that facilitates communications between a device, a computing device, and a cloud-based computing system. The information shared within this tri-partite structure may enable machines to operate more efficiently, users to perform their tasks more efficiently, and generally provide for improved operations of an industrial automation system.

In one embodiment, a first computing device in an industrial automation system may include an image sensor that captures a visual representation of a portion of a facility including a first industrial automation equipment as image data and a communication component that communicatively couples the first computing device to a second computing device via a communication network, in which the first computing device receives relevant information related to the first industrial automation equipment from the second computing device. The first computing may include a display component that displays a plurality of real objects that visually represent physical features in the portion of the facility based at least in part on the image data, in which the plurality of real objects include a first real object that visual represents physical features of the first industrial automation equipment; and that displays a first virtual object superimposed on at least a portion of the plurality of real objects based at least in part on the relevant information.

In another embodiment, a tangible, non-transitory, computer-readable medium that stores instructions executable by a processor in a computing device. The instructions include instructions to determine, using the processor, a location and an orientation of the computing device with respect to physical features in a facility, in which the physical features include a first industrial automation equipment; instruct, using the processor, the computing device to display a plurality of real objects that visually represent one or more of the physical features, in which the plurality of real objects include a first real object when the computing device is orientated toward and located proximate to the first industrial automation equipment, in which the first real object visually represents the first industrial automation equipment; instruct, using the processor, the computing device to display a first virtual object such that the first virtual object is superimposed on at least a portion of the plurality of real objects, in which the first virtual object visually indicates relevant information associated with the first industrial automation equipment and is displayed adjacent to the first real object.

In yet another embodiment, a method includes displaying, using a display component of a computing device in an industrial automation system, a real object that visually represents industrial automation equipment of the industrial automation system based at least in part on image data capturing the industrial automation equipment; displaying, using the display component, a virtual object that visually indicates one or more operational parameters of the industrial automation equipment; and determining, using a processor of the computing device, one or more procedure instructions, assessment information, or both based at least in part on the real object and the virtual object, in which the one or more procedure instructions are executed to perform an operation in the industrial automation system and the assessment information includes one or more recommendations to adjust the industrial automation system.

DRAWINGS

These and other features, aspects, and advantages of the present disclosure will become better understood when the following detailed description is read with reference to the accompanying drawings in which like characters represent like parts throughout the drawings, wherein:

FIG. 12 is a flow diagram describing a method for displaying real objects and virtual objects on the display, in accordance with embodiments presented herein; and FIG. 13 is a flow diagram describing a method for capturing visual representations used to display real objects, in accordance with embodiments presented herein.

DETAILED DESCRIPTION

Figure 1:
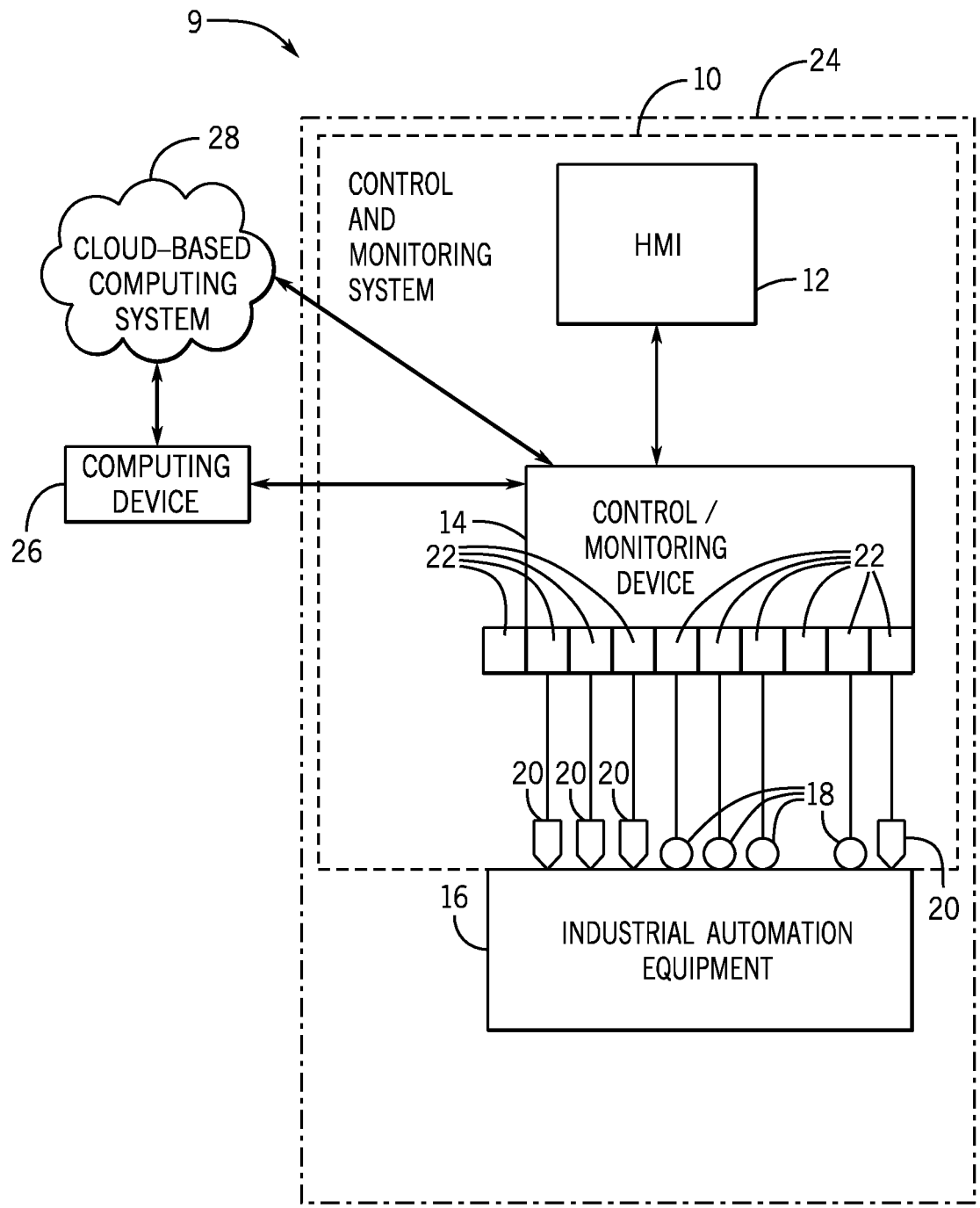
FIG. 1 is a block diagram of an industrial automation system, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, industrial automation systems are often used to perform a process in facilities, such as plants or factories. For example, in some embodiments, the process may include a manufacturing process, a steady state process, a batch process, a chemical process, a material handling process, an energy utilizing process, an energy production process, or any combination thereof. Accordingly, the process generally utilizes one or more inputs, such as electrical energy and/or raw materials, to produce one or more outputs, such as manufacturing products and/or byproducts.

To facilitate performing the process, the industrial automation system generally includes various machines and/or devices that perform functions. To simplify the following discussion, the machines and/or devices are generally referred to herein as "automation equipment." To control and monitor the automation equipment, additional devices, such as computing devices, controllers, input/output (I/O) modules, motor control centers, human machine interfaces (HMIs), operator interfaces, contactors, starters, drives, scanners, gauges, valves, flow meters, and the like, may be coupled to the automation equipment.

Since the industrial automation system may include various types of automation equipment, operation of the automation equipment may be interdependent with each other and with various types of control and monitoring equipment. For example, a motor drive may supply electrical power to a motor to actuate the motor. As such, when the motor drive is disabled, the motor may also be disabled.

Thus, to facilitate interoperation, relevant information may be communicated between automation equipment, industrial automation systems, computing devices disposed in the equipment or the industrial automation systems, a computing device unconnected with the equipment or the industrial automation system, users, or any combination thereof. For example, the motor drive may communicate its disabled status (e.g., relevant information) to the motor and/or some computing device to inform others to refrain from reconnecting electrical power. As such, the communication of relevant information with the industrial automation system (e.g., between automation equipment, industrial automation systems, computing devices, and/or users) may facilitate operation of the industrial automation system.

Accordingly, as will be described in more detail below, the present disclosure provides techniques to facilitate communication of relevant information in an industrial automation system and techniques to facilitate controlling operation of the industrial automation system based on the relevant information. In some embodiments, to facilitate the communication of relevant information, the industrial automation system may include a communication architecture that is structured according to a tri-partite structure. More specifically, the tri-partite structure may facilitate communication between automation equipment (or connected industrial automation systems), computing devices (e.g., a mobile computing device or a cloud-based computing system), or any combination thereof. In this manner, the tri-partite structure may facilitate operation of the industrial automation system by enabling communication of relevant information.

In some embodiments, the relevant information may include status information, operational parameter information, assessment information, and/or procedure instructions related to one or more automation equipment or the industrial automation system as a whole. Accordingly, to facilitate controlling/managing operation of the industrial automation system, relevant information may be determined and, in some embodiments, presented to a user (e.g., an operator). As such, operation of the industrial automation system may be facilitated by the determination and/or presentation of the relevant information.

Some embodiments of the present disclosure may facilitate determining the relevant information in an automated and/or remote manner based at least in part on image data capturing a visual representation of physical features of a facility, such as automation equipment, and/or audio data capturing an audio representation of sound in the facility. As used herein, "image data" is intended to describe any data acquired by an image sensor. As such, image data may include data used to display one or more single images or a series of sequentially captured images (e.g., a video feed) depicting physical features, for example, as captured by an image sensor of a computing device. Additionally, as used herein, "audio data" is intended to describe any data acquired by an audio sensor. As such, the audio data may be used to playback captured sounds. Thus, in some embodiments, image data and/or audio data associated with some automation equipment may be used to identify the automation equipment and/or other relevant information related to the automation equipment or an environment surrounding the equipment.

For example, to facilitate remote determination of relevant information, image data and/or audio data capturing a portion of a facility may be communicated to a computing device and presented to a user (e.g., a service professional) who is physically remote from the facility. To help illustrate, in some embodiments, a mobile computing device (e.g., a computing device) may be moved around the facility to capture a visual representation of a motor drive (e.g., automation equipment) as image data. The mobile computing device may then communicate the image data to a cloud-based computing system (e.g., a computing device) via a communication network.

Based on the received image data, the cloud-based computing system may provide a visual representation of the motor drive to the user (e.g., via a display of a network-connected computing device). Additionally, the cloud-based computing system may provide a prompt requesting its user, who may be physically remote from the facility, to input an identity (e.g., relevant information) of the displayed motor drive. The cloud-based computing system may then communicate the identity of the motor drive back to the mobile computing device. In this manner, the image data may facilitate determining relevant information in a remote manner, for example, by leveraging knowledge of a user physically remote from the facility.

Additionally, to facilitate automated determination of relevant information, a computing device may perform an automated search based on image data and/or audio data capturing a portion of a facility. To help illustrate, in some embodiments, a mobile computing device (e.g., a computing device) may be moved around the facility to capture a visual representation of a motor drive (e.g., automation equipment) as image data. The mobile computing device may then communicate the image data to a cloud-based computing system (e.g., a computing device).

Based on the received image data, the cloud-based computing system may perform an automated search to determine identity (e.g., relevant information) of the motor drive. More specifically, the cloud-based computing system may determine physical dimensions or shapes of the motor drive based on the image data. In some embodiments, a storage component (e.g., database) may store associations between automation equipment and their respective physical dimensions and/or shapes. Accordingly, in such embodiments, the cloud-based computing system may search the storage component using the physical dimensions and/or shape of the motor drive to determine its identity. Additionally, in some embodiments, the cloud-based computing system may request information from the automation equipment regarding their respective physical dimensions. Accordingly, in such embodiments, the cloud-based computing system may search the received physical dimensions using the physical dimensions of the motor drive to determine its identity. In this manner, the image data may facilitate determining relevant information in an automated manner, for example, by leveraging automated searching capabilities of a computing device.

Additionally, some embodiments of the present disclosure facilitate presentation of determined relevant information. In some embodiments, a computing device may display graphical objects on its display to present relevant information to a user. More specifically, the graphical objects may include both real objects and virtual objects. As used herein, a "real object" may describe a graphical object that depicts a physical feature present in a facility. In some embodiments, the real objects may be based at least in part on image data capturing the physical feature. Additionally, as used herein, a "virtual object" is intended to describe a graphical object that is not physically present in the facility. That is, the virtual object may indicate information relevant to a displayed real object. In some embodiments, the virtual objects may be based at least in part on relevant information received from another computing device, automation equipment, a user, or any combination thereof.

To help illustrate, in some embodiments, a mobile computing device (e.g., a computing device) may be moved around the facility to capture a visual representation of a motor (e.g., automation equipment) as image data. Based on the image data, the mobile computing device may display the automation equipment real object to visually represent the automation equipment to its user.

Additionally, the mobile computing device may determine temperature (e.g., relevant information) of the motor. In some embodiments, the mobile computing device may receive a temperature measurement from a cloud-based computing system (e.g., a computing device) based on the captured image data. Additionally, in some embodiments, the mobile computing device may request a sensor or the automation equipment to return a temperature measurement.

The mobile computing device may then display a virtual object that includes text to indicate temperature of the motor. As such, the computing device presents the temperature of the motor when the computing device is located proximate and oriented toward the motor drive such that the image data is captured, which may enable a user to crosscheck the received digital temperature measurement with a temperature measured by an analog sensor on the motor. In this manner, the computing device may facilitate presentation of relevant information, for example, by leveraging the location and/or orientation of the computing device relative to physical features in a facility.

FIG. 1 is a diagrammatical representation of an exemplary industrial automation system 9, in accordance with embodiments presented herein. In FIG. 1, the industrial automation system 9 includes a control and monitoring system 10, which is illustrated as including a human machine interface (HMI) 12 and a control/monitoring device (e.g., automation controller) 14 adapted to interface with devices that may monitor and control various types of industrial automation equipment 16. In some embodiments, the industrial automation equipment 16 may include automation equipment used in an industrial setting. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling, and other applications.

Additionally, the industrial automation equipment 16 may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include controllers, input/output (I/O) modules, motor control centers, motors, human machine interfaces (HMIs), operator interfaces, contactors, starters, sensors 18, actuators 20, drives, relays, protection devices, switchgear, compressors, sensor, actuator, firewall, network switches (e.g., Ethernet switches, modular-managed, fixed-managed, service-router, industrial, unmanaged, etc.) and the like.

In certain embodiments, one or more properties of the industrial automation equipment 16 may be monitored and controlled by certain equipment for regulating control variables used to operate the industrial automation equipment 16. For example, sensors 18 and actuators 20 may monitor various properties of the industrial automation equipment 16 and may adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP, ControlNet, DeviceNet, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, and LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28.

Figure 2:
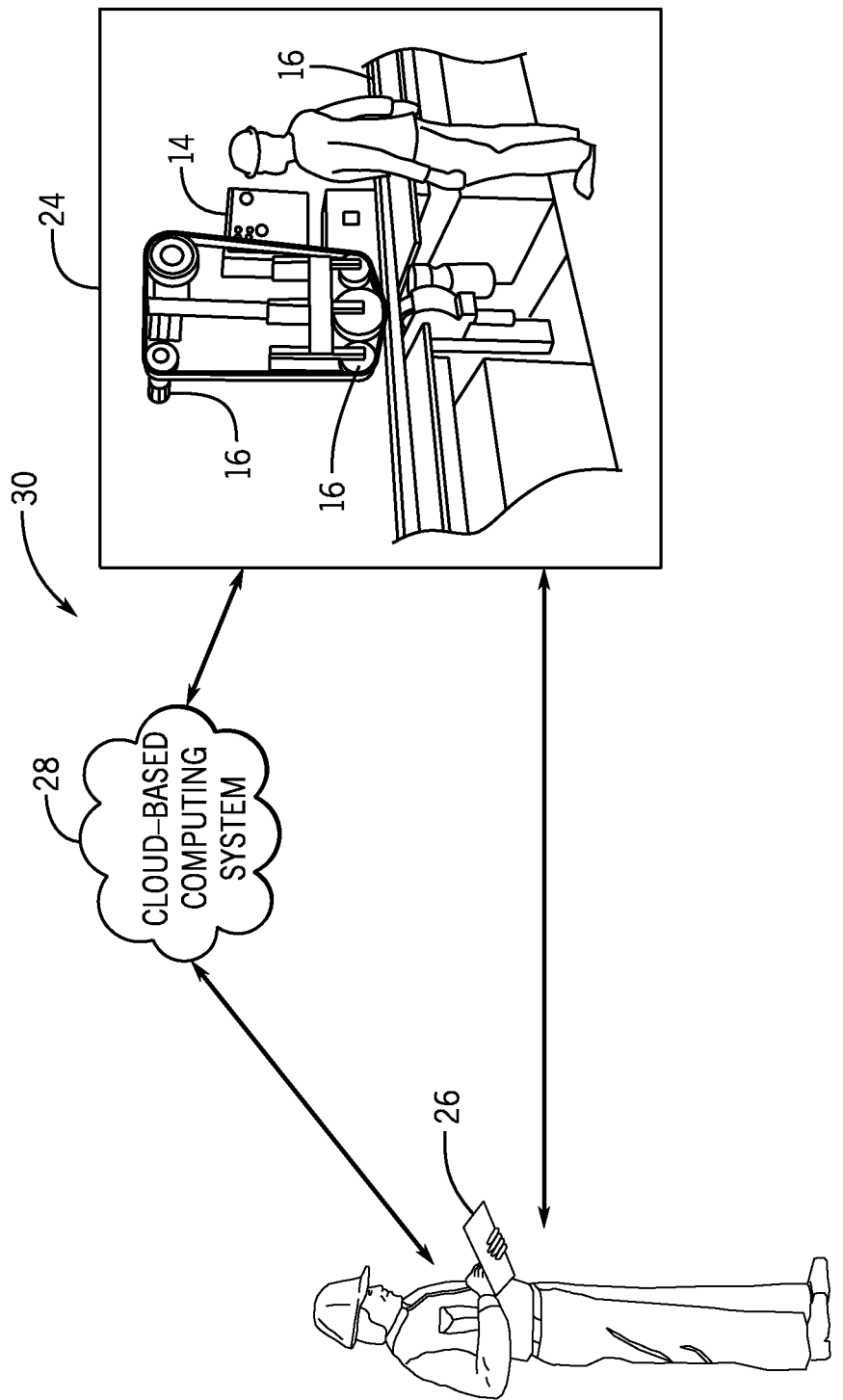
FIG. 2 is a schematic representation of a communication network, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

In addition to communicating with the industrial automation equipment 16, the computing device 26 may also communicate with the cloud-based computing system 28. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment 16, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
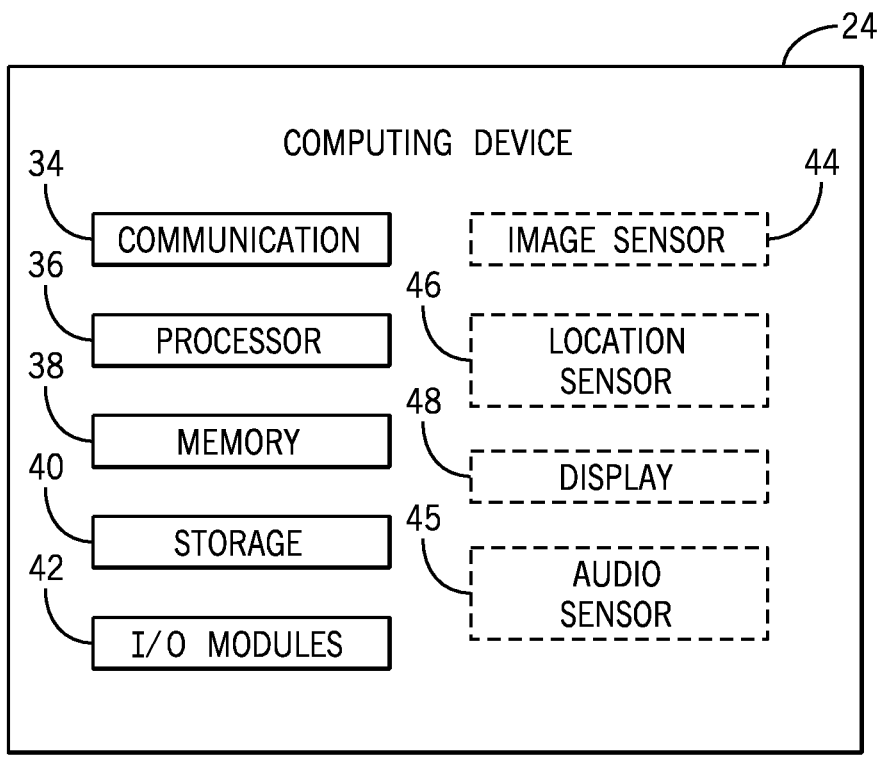
FIG. 3 is a block diagram of a computing device, in accordance with embodiments presented herein.

FIG. 3 is a block diagram of a computing device, in accordance with embodiments presented herein. As depicted, the computing device 26 includes a communication component 34, a processor 36, a memory 38, a storage component 40, and input/output (I/O) modules 42. Some embodiments of the computing device 26 may also have an image sensor (e.g., a camera) 44, a location sensor 46, and a display 48.

In some embodiments, the communication component 34 may enable communicatively coupling the computing device 26 to the communication network 30, for example, via a wired and/or a wireless connection. More specifically, the communication component 34 may convert data in accordance with a network protocol used by the communication network 30 and transmit the data over the communication network 30. Additionally, the communication component 34 may receive data from the communication network 30 and interpret the data based on the network protocol.

Additionally, the processor 36 may execute instructions and/or operate on data stored in the memory 38 and/or the storage component 40. As such, the processor 36 may include any type of processing circuitry (e.g., a computer processor or microprocessor) capable of executing computer-executable instructions. In certain embodiments, the processor 34 may include multiple processors working together. Additionally, the memory may be any suitable tangible, non-transitory computer-readable medium (e.g., an article of manufacture) capable of storing computer-executable instructions and/or data.

More specifically, in some embodiments, the processor 36 may execute instructions to provide software applications that enable tracking and/or monitoring of the operation of the industrial automation equipment 16 and thus the industrial automation system 9. For example, in such instances, the software application may communicate with the automation controller 14, one or more components of the control and monitoring system 10 (e.g., a sensor 18), the industrial automation equipment 16, and/or another computing device 26 to determine operational parameters of the industrial automation equipment 16. Additionally, in some embodiments, the software application may then analyze the operational parameters and/or present the operational parameters to a user.

Additionally, in some embodiments, the processor 36 may execute instructions to provide software applications that enable controlling operation of the industrial automation equipment 16. For example, in such instances, the software applications may determine a control instruction to perform a control action. The software applications may then communicate the control instruction to the industrial automation equipment 16, thereby instructing the industrial automation equipment 16 to perform the control action. In some embodiments, the control instruction may be determined by the computing device 26 and/or input by a user.

To enable communicating with the user, the I/O modules 42 may couple the computing device 26 to peripheral components. For example, the I/O modules 42 may interface with input devices, such as a keyboard, a mouse, buttons, or the HMI 12, which enable a user to input instructions to the computing device 26. Additionally, in some embodiments, the display 48 may be touch sensitive, which may enable a user to input instructions by interacting with the display 48. For example, a user may select a button graphical object (e.g., a virtual object) on the display 48 to instruct the industrial automation system 9 to perform a particular operation. In this manner, the user may input instructions that instruct the industrial automation system 9, for example, to determine relevant information (e.g., operational parameters, identity information, status information, operational parameter information, or assessment information), perform a particular control action, execute a procedure (e.g., an audit procedure, a lockout-tagout procedure, a device offline procedure, a component replacement procedure, or a service/maintenance procedure), or the like.

In addition to enabling user inputs, the display 48 may also present (e.g., provide) visualizations (e.g., graphical objects) associated with a software application. In some embodiments, the display 48 may display information relevant to the industrial automation equipment 16 as a graphical object. For example, the display 48 may display operational parameters of the industrial automation equipment 16 as a graphical object (e.g., a virtual object). In this manner, the display 48 may enable a user to monitor operation of the industrial automation equipment 16. As such, the display 48 may be any suitable type of display, such as a liquid crystal display (LCD), a plasma display, or an organic light emitting diode (OLED) display. As will be described in more detail below, the display 48 may enable relevant information to be displayed to indicate an association with the industrial automation equipment 16. For example, relevant information (e.g., operational parameters) may be displayed as text (e.g., a virtual object) adjacent a visual representation of corresponding industrial automation equipment 16 (e.g., a real object).

To facilitate capturing the real object, the computing device 26 may also include an image sensor 44, such as a digital camera or other image acquisition circuitry. More specifically, the image sensor 44 may be capable of capturing a visual representation of surrounding physical features, for example, as image data. As will be described in more detail below, visual representations of a portion of the facility may be transmitted to another computing device 26 to enable remotely and/or automatically identifying the industrial automation equipment 16 and/or providing other relevant information.

Additionally, the computing device 26 may also include an audio sensor 45, such as a microphone. More specifically, the audio sensor 45 may be capable of capturing a digital representation of surrounding sounds, for example, as audio data. As will be described in more detail below, audio representations of a portion of the facility may be transmitted to another computing device 26 to enable remotely and/or automatically identifying an industrial automation equipment 16 and/or providing other relevant information.

In some embodiments, the relevant information may be provided to the computing device 26 based at least in part on location of the computing device 26 and/or proximity to the industrial automation equipment 16. Accordingly, the computing device 26 may include a location sensor 46, such as a global positioning system (GPS) sensor, a radio frequency transceiver, an infrared sensor, and the like. In some embodiments, the location sensor 46 may enable the computing device 26 to determine and provide information relevant to particular industrial automation equipment 16 once the computing device 26 is within a certain distance from the particular industrial automation equipment 16.

Although the components described above have been discussed with regard to the computing device 26, it should be noted that similar components may be used in the automation controller 14, the mobile computing device 26, and the like. Moreover, the listed components are provided as example components and the embodiments described herein are not to be limited to the components described with reference to FIG. 3. More specifically, the components included in each computing device 26 may be dependent on desired functionality of the computing device 26. For example, since a mobile computing device 26 may be deployed in closer proximity to the industrial automation equipment 16, the mobile computing device 26 may include various other sensors, such as an accelerometer or a gas sensor, to provide additional information related its surrounding environment. Further, it should be noted again that the computing device 26 may be present within the industrial automation equipment 16 to monitor and control the operation of the industrial automation equipment 16, as well as to participate in the communication network 30.

Additionally, a cloud-based computing system 28 may include facilitate automated distribution of relevant information to one or more other computing devices 26. More specifically, in some embodiments, the cloud-based computing system 28 may receive data acquired by other computing devices 26 and/or the industrial automation equipment 16. After receiving this data, in some embodiments, the cloud-based computing system 28 may perform large-scale data analysis operations on the data. Additionally, the cloud-based computing system 28 may forward the acquired data and/or analyzed data to one or more other computing devices 26, the automation controller 14, one or more industrial automation equipment 16, or the like. As such, the cloud-based computing system 28 may include an expanded storage component 40 to store large amounts of data, an expanded processor component 36 to facilitate large-scale data analysis, and/or a communication component 34 that enables serving data to multiple computing devices 26.

Figure 4:
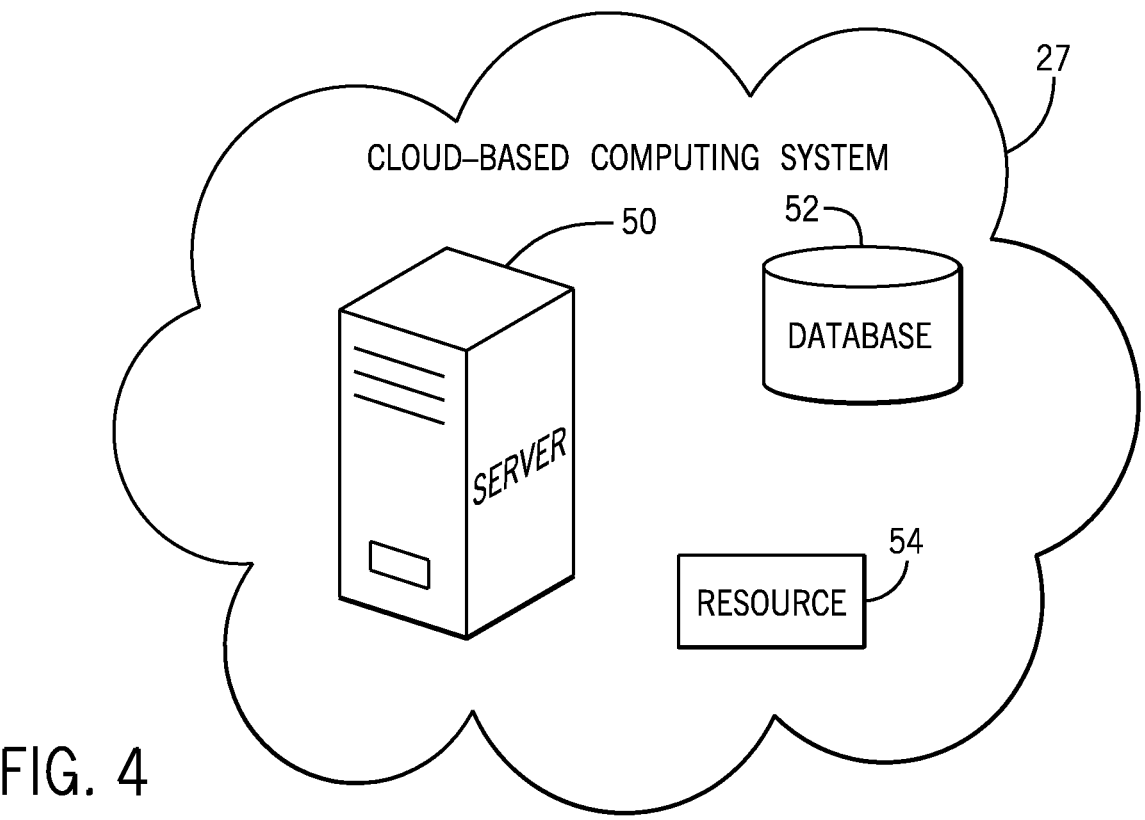
FIG. 4 is a block diagram a cloud-based computing system, in accordance with embodiments presented herein.

FIG. 4 is a block diagram a cloud-based computing system, in accordance with embodiments presented herein. As depicted, the cloud-based computing system 28 includes a server 50, a database 52, and resources 54. More specifically, in some embodiments, the server 50 may communicatively couple the cloud-based computing system 28 to one or more other computing devices 26 to enable distribution of tasks and thereby facilitate processing efficiency. In this manner, the server 50 may facilitate complex computations, such as large-scale data analysis.

Additionally, the database 52 may store information relevant to various aspects of the industrial automation system 9, the industrial automation equipment 16, computing devices 26, operators 32, and the like. More specifically, the relevant information stored in the database may facilitate automated determination of an identity of the industrial automation equipment 16, status information related to the industrial automation equipment 16, facility status, procedure instructions, assessments (e.g., recommendation) information, or any combination thereof.

For example, the database 52 may store an association between identifying information and identity of the industrial automation equipment 16. Additionally, the database 52 may store procedure instructions steps, tools/safety equipment to use, documentation requirements, and the like to facilitate providing procedure instructions. Furthermore, the database 52 may store desired operation of the industrial automation equipment 16, correspondence between undesired operation and likely causes, replacement part correspondence, regulations, associated costs, contact information for service professionals, assessment/recommendation instructions, and the like to facilitate providing assessment/recommendation information for the industrial automation equipment 16. The database 52 may also store other information related to the industrial automation equipment 16, such as warranty information, service contract information, operating manuals, part equivalences, update information, and other information that may be useful to an operator.

In this manner, as will be described in more detail below, the database 52 may facilitate determining information relevant to other computing devices 26, the industrial automation equipment 16, and/or users 32. For example, the cloud-based computing system 28 may search the database 52 using received identifying information to determine the identity of the industrial automation equipment 16. Additionally, based on the identity of the industrial automation equipment 16, the cloud-based computing system 28 may search the database 52 to provide assessment information (e.g., service recommendations) or procedure instructions (e.g., LOTO procedure instructions).

In some embodiments, the cloud-based computing system 28 may also include access to resources 54. More specifically, the resources 54 may be a collection of published documents or webpages containing information that may be relevant to the industrial automation system 9, the industrial automation equipment 16, environmental conditions, and the like. For example, the resources 54 may include information regarding product recalls for the industrial automation equipment 16, weather advisory notices for the area around the facility, and the like. As such, in some embodiments, the resources 54 may be accessed by the cloud-based computing system 28 via a communication network, such as the Internet.

As will be described in more detail below, the resources 54 may provide additional context for determining relevant information. For example, when a recall for the industrial automation equipment 16 is determined via the resources 54, the cloud-based computing system 28 may determine replacement part recommendations and/or location of the recalled industrial automation equipment 16. Additionally, when a weather advisory for the area around the facility is determined via the resources 54, the cloud-based computing system 28 may determine lockout-tagout (LOTO) procedure instructions to disconnect portions of the industrial automation system 9 that may be affected by inclement weather.

Determination of Relevant Information

Figure 5:
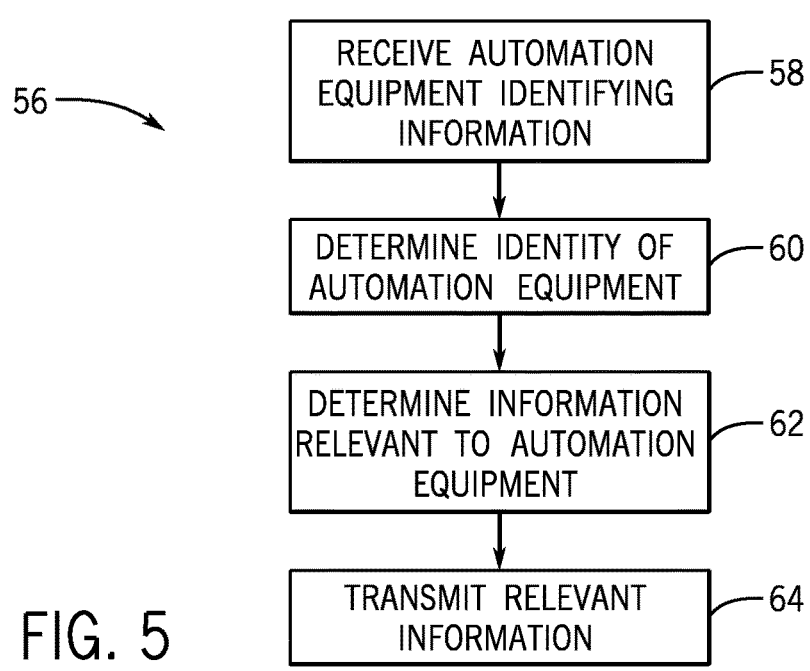
FIG. 5 is a flow diagram of a method for communicating relevant information, in accordance with embodiments presented herein.

FIG. 5 is a flow diagram of a method for communicating relevant information, in accordance with embodiments presented herein. Generally, the method 56 includes receiving industrial automation equipment identifying information (block 58), determining an identity of the industrial automation equipment 16 (block 60), determining information relevant to the industrial automation equipment 16 (block 62), and transmitting the relevant information (block 64). In some embodiments, the method 56 may be implemented by instructions stored in a tangible, non-transitory, computer-readable medium, such as the memory 38 or the storage component 40, and executable by processing circuitry, such as processor 36. In other words, the method 56 may be implemented by one or more computing devices 26.

To simplify the following discussion, the method 56 will be described in relation to a mobile computing device 26 (e.g., a second computing device 26) and a cloud-based computing system 28 (e.g., a first computing device 26). However, one of ordinary skill in the art should recognize that the method 56 may be implemented by any combination of suitable computing devices 26.

For example, a cloud-based computing system 28 may receive identifying information of the industrial automation equipment 16 (block 58). In some embodiments, the cloud-based computing system 28 may receive the identifying information from a mobile computing device 26. For example, the identifying information may include image data capturing a visual representation of the industrial automation equipment 16, audio data capturing a audio representation of the industrial automation equipment 16, and/or an alphanumeric identifier received from the industrial automation equipment 16, for example, via a near-field communication (NFC) transmitter. Accordingly, in some embodiments, the mobile computing device 26 may capture identifying information (e.g., image data or audio data) corresponding with the industrial automation equipment 16 via its image sensor 44 and/or audio sensor 45. Additionally, in some embodiments, the mobile computing device 26 may receive the identifying information (e.g., unique identifier) corresponding with the industrial automation equipment 16 from the industrial automation equipment 16 or from a computing device disposed within the industrial automation equipment 16 via an NFC transmitter.

After determining the identifying information, the mobile computing device 26 may transmit (e.g., communicate) the identifying information to the cloud-based computing system 28 via the communication network 30. Additionally, in some embodiments, mobile computing device 26 may facilitate presenting the identifying information to a user of the mobile computing device 26 (e.g., a second user). For example, the mobile computing device 26 may present the identifying information to the user by displaying visual representations of captured image data on its display 48 and/or by outputting audio representations of captured audio data via speakers.

Based on the identifying information, the cloud-based computing system 28 may determine the identity of the industrial automation equipment 16 (block 60). As will be described in more detail below, the cloud-based computing system 28 may determine identity of the industrial automation equipment 16 in a remote and/or automated manner. For example, the cloud-based computing system 28 may display the identifying information on its display or on a display of a connected computing device and request its user (e.g., service professional or a first user) physically remote from the industrial automation equipment 16 to identify the industrial automation equipment 16. Additionally, the cloud-based computing system 28 may search its storage component 40 (e.g., database 52) in an automated manner to match the identifying information with a known identity of the industrial automation equipment 16.

After determining the identity of the industrial automation equipment 16, the cloud-based computing system 28 may determine relevant information for the industrial automation equipment 16 (block 62). As described above, the relevant information may include various types of information related to the industrial automation equipment 16 and/or the industrial automation system 9, such as operational parameter information, status information, procedure instructions, and/or assessments information (e.g., recommendations or audit results). As will be described in more detail below, the cloud-based computing system 28 may determine the relevant information in a remote and/or automated manner. For example, the cloud-based computing system 28 may request the first user to input the relevant information while physically remote from the industrial automation equipment 16. Additionally, the cloud-based computing system 28 may search its storage component 40 (e.g., database 52) in an automated manner to determine the relevant information.

After determining the relevant information, the cloud-based computing system 28 may transmit the relevant information to the second computing device (block 64). That is the cloud-based computing system 28 may transmit the relevant information to the mobile computing device 26 via the communication network 30.

In addition to transmitting the relevant information, the cloud-based computing system 28 may instruct the components of the industrial automation system 9 (e.g., the cloud-based computing system 28, the mobile computing device 26, one or more computing devices 26, the industrial automation equipment 16, one or more users 32, the automation controller 14, or any combination thereof) to perform one or more operations based on the relevant information.

In some embodiments, the operations may include executing a step in the procedure instructions, instructing the industrial automation equipment 16 to execute the step in the procedure instructions, prompting a user to perform the step in the procedure instructions, displaying received operational parameters, displaying received assessment information (e.g., audit results), or any combination thereof. Generally, the operations performed may be based at least in part the type of the relevant information. For example, when the relevant information includes operational parameter information and/or assessment information, a computing device 26 may display graphical objects (e.g., virtual objects) to indicate the relevant information to its user.

Additionally, when the relevant information includes procedure instructions, a computing device 26 may execute steps in the procedure instructions and/or display a prompt requesting a user execute steps in the procedure instructions. In some embodiments, the computing device 26 may execute a step by instructing the industrial automation equipment 16 to perform a control action. In this manner, the relevant information may be used to assess and/or control the industrial automation equipment 16 in a remote and/or automated manner.

Figure 6:
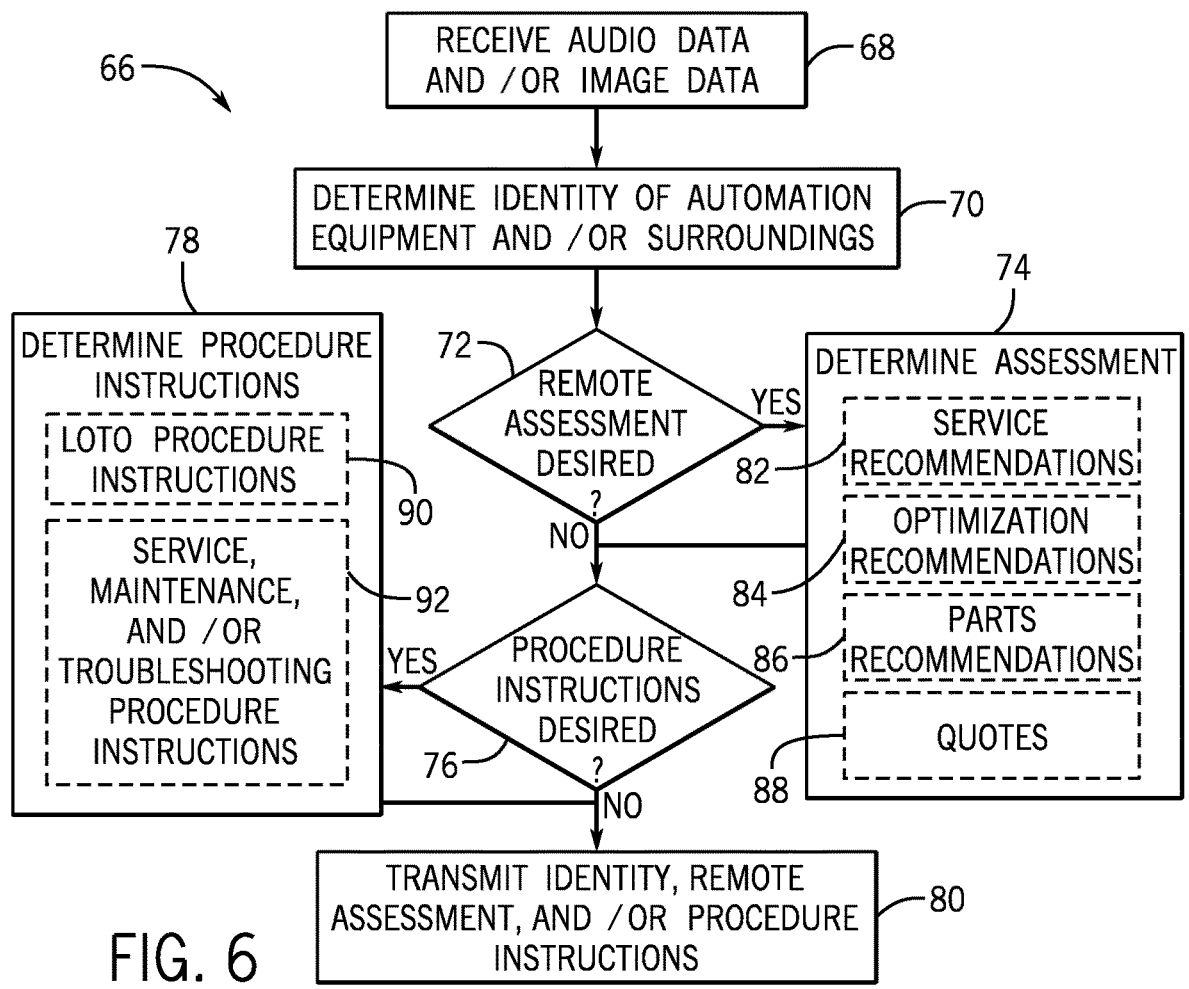
FIG. 6 is a flow diagram of a method for remotely providing relevant information, in accordance with embodiments presented herein.

FIG. 6 is a flow diagram of a method for remotely providing relevant information, in accordance with embodiments presented herein. Generally, the method 66 includes receiving image data and/or audio data (block 68), determining identity of the industrial automation equipment 16 and/or surroundings (block 70), determining whether remote assessment is desired (block 72), determining an assessment when remote assessment is desired (block 74), determining whether procedure instructions are desired (block 76), determining procedure instructions when procedure instructions are desired (block 78), and transmitting identity, remote assessment, and/or procedure instructions (block 80). In some embodiments, the method 66 may be implemented by instructions stored in a tangible, non-transitory, computer-readable medium, such as the memory 38 or the storage component 40, and executable by processing circuitry, such as processor 36.

Accordingly, in such embodiments, the method 66 may be implemented by one or more computing devices 26. To simplify the following discussion, the method 66 will be described in relation to a mobile computing device 26 (e.g., a second computing device 26) and a cloud-based computing system 28 (e.g., a first computing device 26). However, one of ordinary skill in the art should recognize that the method 66 may be implemented by any combination of suitable computing devices 26.

For example, the cloud-based computing system 28 may receive captured image data and/or audio data (block 68). In some embodiments, the cloud-based computing system 28 may be physically remote from the location the image data and/or audio data was captured. Accordingly, in such embodiments, the cloud-based computing system 28 may receive the image data and/or audio data from a mobile computing device 26 via the communication network 30. As described above, the mobile computing device 26 may capture visual representation of physical features proximate its image sensor 44 as image data and/or capture audio representations of sounds proximate its audio sensor 45 as audio data.

Based on the received image data and/or audio data, the cloud-based computing system 28 may determine the identity of the industrial automation equipment 16 (block 70). In some embodiments, the cloud-based computing system 28 may determine the identity of the industrial automation equipment 16 by displaying graphical objects (e.g., via a connected computing device) based on the image data and/or outputting sound based on the audio data and requesting its user (e.g., a first user), who is physically remote from the industrial automation equipment 16, to input the identity of the industrial automation equipment 16. For example, the cloud-based computing system 28 may display a visual representation (e.g., real object) of the industrial automation equipment 16 captured by the image data and display a prompt (e.g., a virtual object) requesting the first user to input the identity of the industrial automation equipment 16.

In this manner, the cloud-based computing system 28 may leverage the knowledge of the first user, who is physically remote from the industrial automation equipment 16, to determine the identity of the industrial automation equipment 16. In some embodiments, the cloud-based computing system 28 may further leverage the knowledge of the first user by assisting the input of the industrial automation equipment 16 identity. For example, based on the image data, the cloud-based computing system 28 may determine physical dimensions and/or shapes of the industrial automation equipment 16. Additionally, a storage component (e.g., database 52) may store associations between different types of the industrial automation equipment 16 and their respective physical dimensions. Accordingly, in such embodiments, the cloud-based computing system 28 may search the storage component based on the physical dimensions and/or shapes determined from the image data to determine possible identities of the industrial automation equipment 16, which may then be provided (e.g., as virtual objects) to the first user. In addition to physical dimensions and/or shapes of the industrial automation equipment 16, the storage component (e.g., database 52) may also store additional information that may be used to determine the identity of the industrial automation equipment 16. For example, the storage component may include data related to a preferred arrangement of the industrial automation equipment 16, devices and/or facility components (e.g., pipelines, exits, light fixtures) typically disposed near the industrial automation equipment 16, location information regarding the industrial automation equipment 16, and the like. This information may assist the cloud-based computing system 28 to determine the identity of the industrial automation equipment 16.

Similarly, based on the audio data, the cloud-based computing system 28 may determine a sound profile of the industrial automation equipment 16. Additionally, a storage component (e.g., database 52) may store associations between the industrial automation equipment 16 and their respective sound profiles. Accordingly, in such embodiments, the cloud-based computing system 28 may search the storage component based on the sound profile determined from the audio data to determine possible identities of the industrial automation equipment 16, which may then be provided (e.g., as virtual objects) to the first user. The cloud-based computing system 28 may then determine the identity of the industrial automation equipment 16 when the first user selects one of the provided suggestions or inputs a different identity.

Based on the received image data and/or audio data, the cloud-based computing system 28 may also determine the surroundings of the industrial automation equipment 16 (block 70). More specifically, in addition to the industrial automation equipment 16 itself, the image data and/or audio data may also capture a visual representation and an audio representation, respectively, of features surrounding the industrial automation equipment 16, such as adjacent industrial automation equipment 16 and/or environmental conditions (e.g., environmental noise). As will be described in more detail below, the surroundings may be used when determining relevant information for the industrial automation equipment 16. In some embodiments, the cloud-based computing system 28 may determine identity of adjacent industrial automation equipment 16 by displaying the visual representations (e.g., real objects) captured by the image data and/or outputting sound captured by the audio data and requesting the first user to input the identity of captured adjacent industrial automation equipment 16 and/or environmental conditions (e.g., debris or smoke).

It should be noted that when focused on a particular piece of industrial automation equipment 16, the image data may predominantly capture the industrial automation equipment 16. In other words, the surrounding physical features may be incompletely captured by the image data. As such, to facilitate determining the surroundings, the cloud-based computing system 28 may leverage the knowledge of the first user and/or other relevant information. For example, the cloud-based computing system 28 may request the first user to input the likely identity or identities of displayed debris based at least in part on personal knowledge. Leveraging the first user may be particularly useful when only portions of the surroundings are captured because the first user may extrapolate the captured portions based on his/her personal knowledge.

Nevertheless, in some embodiments, the cloud-based computing system 28 may further leverage the knowledge of the first user by assisting the input of the identity of the surroundings, thereby improving efficiency. For example, the cloud-based computing system 28 may determine physical dimensions of the portions of surrounding industrial automation equipment captured by the image data. Accordingly, when a storage component (e.g., database 52) stores association between the industrial automation equipment 16 and their physical dimensions, the cloud-based computing system 28 may search the storage component to determine possibility identities of surrounding automation equipment.

Since the image data may capture only a portion of surrounding the industrial automation system 9, the cloud-based computing system 28 may use the identity of the identified industrial automation equipment 16 to facilitate determining possible identities of the surroundings (e.g., other automation equipment 16) in the industrial automation system 9. For example, the cloud-based computing system 28 may determine the types of automation equipment 16 that normally surround the identified industrial automation equipment 16, a list of the industrial automation equipment 16 in a facility containing the identified industrial automation equipment 16, or the like. The cloud-based computing system 28 may then determine the identity of the surroundings of the industrial automation equipment 16 when the first user selects one of the provided suggestions or inputs a different identity.

Additionally, the cloud-based computing system 28 may instruct the mobile computing device 26 to adjust the capture of the image data to more completely capture the surrounding features. In response, in some embodiments, the mobile computing device 26 may relay the instruction to the second user (e.g., user) by displaying a prompt (e.g., as a virtual object) on its display 50. As such, the cloud-based computing system 28 may facilitate determining identity of the industrial automation equipment 16 and/or surroundings based on shape (e.g., dimension) recognition technology, audio recognition technology, expected industrial automation equipment, or the like.

The cloud-based computing system 28 may then determine whether a remote assessment of the industrial automation equipment 16 is desired (block 72). As used herein, a "remote assessment" is intended to describe an assessment (e.g., an audit) performed on the industrial automation equipment 16 by a user physically remote from the industrial automation equipment 16.

In some embodiments, the cloud-based computing system 28 may receive an indication whether the remote assessment is desired from the mobile computing device 26. For example, in such embodiments, the second user may input a request (e.g., as digital signal) to the mobile computing device 26 when a remote assessment is desired. The mobile computing device 26 may then communicate the request to the cloud-based computing system 28 via the communication network 30. Based on the received request, the cloud-based computing system 28 may determine that the remote assessment is desired. In some embodiments, the cloud-based computing system 28 may also provide an indication to the first user that the remote assessment is desired by displaying a prompt (e.g., as a virtual object) on its display 50.

When a remote assessment is desired, the cloud-based computing system 28 may receive the remote assessment (block 74). In some embodiments, the cloud-based computing system 28 may display visual representations captured by the image data and/or output sound captured by the audio data and request the first user to input the remote assessment. More specifically, displaying the visual representations and sound may enable the first user to view and hear the industrial automation equipment 16 and/or surrounding industrial automation equipment 16 in operation.

Accordingly, in some embodiments, the cloud-based computing system 28 may leverage the knowledge of the first user to facilitate providing the remote assessment. For example, the cloud-based computing system 28 may receive an inputted assessment from the first user, which may include service recommendations to maintain or troubleshoot operation of the displayed industrial automation equipment 16 (block 82), optimization recommendations for improving operation of the associated industrial automation system (block 84), and/or parts recommendations for use in the industrial automation equipment 16 (block 86). Moreover, the cloud-based computing system 28 may receive an estimated quote for implementing any of the recommendations from the first user. The quote may include parts requirements, parts costs, service costs, labor costs, and the like (block 88).

Additionally, in some embodiments, the cloud-based computing system 28 may further leverage the personal knowledge of the first user, thereby improving quality and/or efficiency of the remote assessment. For example, the cloud-based computing system 28 may search a storage component 40 (e.g., database 52) to provide the first user criteria, checklists, and/or procedure instructions for providing the remote assessment (e.g., as a virtual object).

The cloud-based computing system 28 may also determine whether procedure instructions are desired (block 76). As discussed above, procedure instructions may include steps that are executed to perform an operation in the industrial automation system, such as a lockout-tagout procedure, servicing procedure instructions, a maintenance procedure, troubleshooting procedure instructions, an assessment, or the like.

In some embodiments, the cloud-based computing system 28 may receive an indication whether the procedure instructions are desired (block 76) from the mobile computing device 26. For example, in some embodiments, the second user may input a request (e.g., as digital signal) to the mobile computing device 26 when procedure instructions are desired. The mobile computing device 26 may then communicate the request to the cloud-based computing system 28 via the communication network 30. Based on the received request, the cloud-based computing system 28 may determine that procedure instructions are desired. In some embodiments, the cloud-based computing system 28 may also provide an indication to the first user that procedure instructions are desired by displaying a prompt (e.g., as a virtual object) on its display 50.

When procedure instructions are desired, the cloud-based computing system 28 may determine the procedure instructions (block 78) to provide to the mobile computing device 26. In some embodiments, the cloud-based computing system 28 may display the visual representations captured by the image data and/or output sound captured by the audio data and request the first user to input the procedure instructions. Additionally, in some embodiments, the procedure instructions may include steps in the procedure, location of the industrial automation equipment 16, tools/safety equipment to use, related documentation, and the like. As described above, displaying the visual representations captured by the image data and/or outputting sound captured by the audio data may enable the first user to view and/or hear the industrial automation equipment 16 and surrounding industrial automation equipment 16 in operation.

Accordingly, in some embodiments, the cloud-based computing system 28 may leverage the knowledge of the first user to facilitate providing the remote assessment. For example, after receiving an indication that procedures are desired, the cloud-based computing system 28 may receive lockout-tagout (LOTO) procedure instructions as input from the first user (block 90). That is, the cloud-based computing system 28 may display a request to the first user to input LOTO procedures for an associated industrial automation equipment 16. The LOTO procedure instructions may include steps on how to disconnect the industrial automation equipment 16, where to put tags indicating the lockout, a location of the industrial automation equipment 16, tools to use to disconnect the industrial automation equipment 16, safety equipment to use, and the like. Additionally, the cloud-based computing system 28 may receive service procedure instructions, maintenance procedure instructions, and/or troubleshooting procedure instructions (block 92) in the same manner as described above. In this way, leveraging the first user may be useful when set procedure instructions are not in place because the first user may use his/her experience and expertise to analyze the industrial automation equipment 16.

In turn, in some embodiments, the first user may send a message to the mobile computing device 26 to provide updated image data and/or audio data that may be used for future procedures (e.g., lockout tagout). For example, when providing lockout-tagout instructions, the first user or the cloud-based computing system 28 may forward an electronic document or a software application that details the requested procedure to the mobile computing device 26. In some embodiments, the cloud-based computing system 28 or the first user may request that the second user provide new image data or audio data that may be used to update the electronic document or software application. As such, the display 48 of the mobile computing device 26 may depict instructions to acquire image data or audio data for some part of the electronic document or software application. Upon receiving the requested image data or audio data, the mobile computing device 26 may transmit the data to the cloud-based computing system 28. At that time, the cloud-based computing system 28 or the first user may update the electronic document or software application using the recently acquired image data and/or audio data. In addition, the newly acquired image data and audio data may be stored in a storage component, such that it may be used to identify the industrial automation equipment 16 or provide additional information regarding the industrial automation equipment 16 for future use.

For instance, in some embodiments, the cloud-based computing system 28 may further leverage the knowledge of the first user by assisting the input of procedure instructions, thereby improving efficiency. For example, the cloud-based computing system 28 may search its storage component 40 (e.g., database 52) to provide the first user related procedure instructions and/or other relevant information, such as the layout of the facility or operation manuals. In other embodiments, the cloud-based computing system 28 may retrieve previously entered or stored procedure instructions for the respective industrial automation equipment 16.

After determining the procedure instructions or determining that the procedure instructions are not desired, the cloud-based computing system 28 may then transmit the identity of the industrial automation equipment 16, the remote assessment (when desired), and the procedure instructions (when desired) (e.g., relevant information) (block 80). In some embodiments, the cloud-based computing system 28 may transmit the relevant information to the mobile computing device 26 via the communication network 30.

Based on the received relevant information, the mobile computing device 26 may then perform various operations. For example, the mobile computing device 26 may provide the identity, assessment, and/or procedure instructions to the second user by displaying graphical objects (e.g., virtual objects) on its display 48. Additionally, the mobile computing device 26 may execute the procedure instructions, for example, to instruct the industrial automation equipment 16 to perform a control action, run a troubleshooting procedure on the industrial automation equipment 16, and/or perform an audit on the industrial automation equipment 16 and/or the industrial automation system.

In this manner, the image data and/or audio data may enable the cloud-based computing system 28, which may be physically remote from the industrial automation equipment 16, to remotely determine relevant information (e.g., identity, assessment, and/or procedure instructions). Thus, costs (e.g., time) associated with determining the relevant information may be reduced, for example, by enabling determination of the relevant information without the first user being physically located within a close proximity of the industrial automation equipment 16. In some embodiments, using the techniques described below, the cloud-based computing system 28 may further facilitate the determination of the relevant information by displaying visual representations (e.g., real objects) captured by the image data superimposed with virtual objects indicating other relevant information (e.g., operational parameters). In such embodiments, the efficiency for determining the relevant information may be facilitated by consolidating presentation of relevant information.

Figure 7:
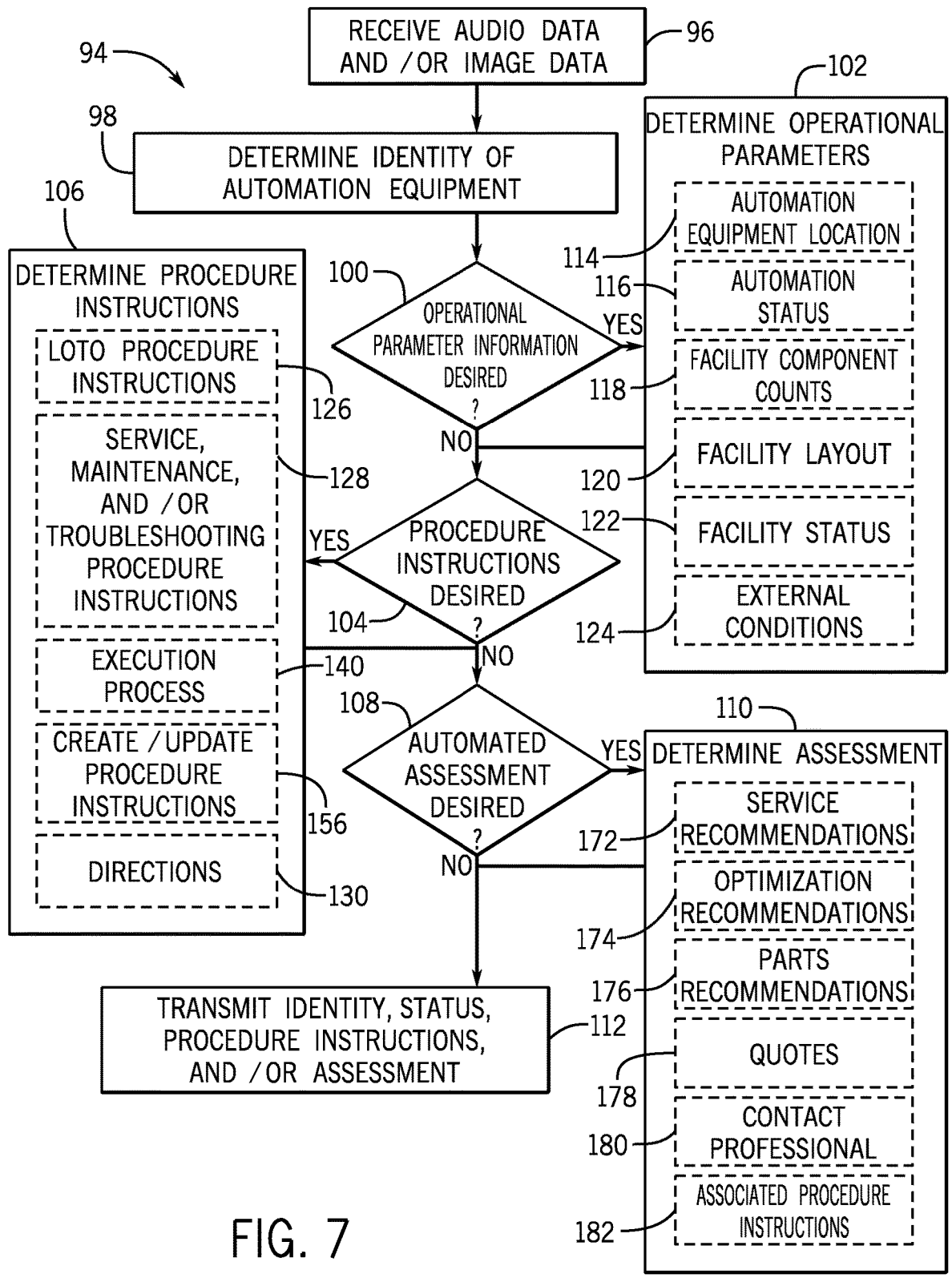
FIG. 7 is a flow diagram of a method for providing relevant information in an automated manner, in accordance with embodiments presented herein.

In addition to remote determination of relevant information, communication of relevant information in the industrial automation system may be facilitated by enabling automated determination of the relevant information. FIG. 7 is a flow diagram of a method for providing relevant information in an automated manner, in accordance with embodiments presented herein. Generally, the method 94 includes receiving captured image data and/or audio data (block 96), determining identity of industrial automation equipment 16 (block 98), determining whether operational parameter information is desired (block 100), determining the operational parameter information when operational parameter information is desired (block 102), determining whether procedure instructions are desired (block 104), determining procedure instructions when procedure instructions are desired (block 106), determining whether automated assessment is desired (block 108), determining an assessment when automated assessment is desired (block 110), and transmitting identity, operational parameter information, procedure instructions and/or an assessment information (block 112). In some embodiments, the method 94 may be implemented by instructions stored in a tangible, non-transitory, computer-readable medium, such as the memory 38 or the storage component 40, and executable by processing circuitry, such as processor 36.

Accordingly, in such embodiments, the method 94 may be implemented by one or more computing devices 26. To simplify the following discussion, the method 94 will be described in relation to a mobile computing device 26 (e.g., a second computing device 26) and a cloud-based computing system 28 (e.g., a first computing device 26). However, one of ordinary skill in the art should recognize that the method 94 may be implemented by any combination of suitable computing devices 26.

For example, a cloud-based computing system 28 may receive captured image data and/or audio data (block 96). In some embodiments, the cloud-based computing system 28 may receive the captured image data and/or audio data from the mobile computing device 26 via the communication network 30. More specifically, the mobile computing device 26 may capture a visual representation of the industrial automation equipment 16 proximate its image sensor 44 and/or an audio representation of the industrial automation equipment 16 proximate its audio sensor 45.

As discussed above, the mobile computing device 26 may capture image data and/or audio data to facilitate identifying the captured representation of the industrial automation equipment 16. Additionally, the mobile computing device 26 may receive other identifying information (e.g., image data, audio data, and a unique identifier) from the industrial automation equipment 16 via a NFC transmitter.

Based the image data, audio data, and/or other identifying information, the cloud-based computing system 28 may determine the identity of the industrial automation equipment 16 (block 98). As discussed above, the cloud-based computing system 28 may determine physical dimensions of the industrial automation equipment 16 based at least in part on the image data. Additionally, a storage component 40 (e.g., database 52) may store associations between the industrial automation equipment 16 and corresponding physical dimensions. In some embodiments, the physical dimensions or shape information may be received from the industrial automation equipment 16 in the facility, a manufacturer, and/or other computing devices 26. Accordingly, in such embodiments, the cloud-based computing system 28 may search the storage component 40 based on the physical dimensions determined from the image data to determine identity of the industrial automation equipment 16.

Additionally, as discussed above, the cloud-based computing system 28 may determine a sound profile of the industrial automation equipment 16 based at least in part on the audio data. The storage component may also store associations between industrial automation equipment 16 and corresponding sound profiles. In some embodiments, the sound profiles may be received from the industrial automation equipment 16 in the facility, a manufacturer, and/or other computing devices 26. Accordingly, in such embodiments, the cloud-based computing system 28 may search the storage component 40 based on the sound profile determined from the audio data to determine the identity of the industrial automation equipment 16. In this manner, the cloud-based computing system 28 may determine the identity of the industrial automation equipment 16 in an automated manner, thereby improving efficiency.

The cloud-based computing system 28 may then determine whether operational parameter information is desired (block 100). In some embodiments, the cloud-based computing system 28 may receive an indication whether operational parameter information is desired from the mobile computing device 26. For example, in such embodiments, the second user may input a request (e.g., as digital signal) to the mobile computing device 26 when operational parameter information is desired. The mobile computing device 26 may then communicate the request to the cloud-based computing system 28 via the communication network 30. Based on the received request, the cloud-based computing system 28 may determine that operational parameter information is desired.

When operational parameter information is desired, the cloud-based computing system 28 may determine the operational parameter information (block 102) based at least in part on identity of the industrial automation equipment 16. In some embodiments, the cloud-based computing system 28 may store associations between the identities of the industrial automation equipment 16 and associated operational parameter information, such as location of the industrial automation equipment 16 in the facility and/or status of the industrial automation equipment 16, in its storage component 40 (e.g., database 52). More specifically, in some embodiments, the cloud-based computing system 28 may receive the operational parameter information from the industrial automation equipment 16 in a facility, the automation controller 14, or another computing device 26.

Additionally, in some embodiments, the cloud-based computing system 28 may store associations between the identities of the industrial automation equipment 16 and identities of a facility in which the industrial automation equipment 16 is located in its storage component 40. Furthermore, in some embodiments, the cloud-based computing system 28 may store associations between the identities of the facilities and associated operational parameter information, such as such as component counts, facility layout, facility status, and/or external conditions, in its storage component 40 (e.g., database 52). Accordingly, in such embodiments, the cloud-based computing system 28 may leverage its automated searching capabilities to facilitate determining the operational parameter information, thereby improving efficiency.

To help illustrate, the cloud-based computing system 28 may determine the operational parameter information associated with the industrial automation equipment 16 by searching its storage component 40 using the identity of the industrial automation equipment 16. For example, the cloud-based computing system 28 may search its storage component 40 to determine the industrial automation equipment 16 location (block 114). In some embodiments, the industrial automation equipment 16 location may include the GPS coordinates of the industrial automation equipment 16 and/or relationship information regarding a location of the industrial automation equipment 16 with respect to a location of the mobile computing device 26.

The cloud-based computing system 28 may also search its storage component to determine status information regarding the industrial automation equipment 16 (block 116). In some embodiments, the status information may include information regarding whether the industrial automation equipment 16 or various parts used in the industrial automation equipment 16 are in operation, whether the industrial automation equipment 16 or the parts therein are functioning properly, whether the industrial automation equipment 16 or the parts therein are obsolete, or the like. The industrial automation equipment 16 or the parts therein may be obsolete when a firmware/software update is available for download, when parts for the industrial automation equipment 16 are in limited supply, when a part is no longer under warranty, when a newer version of a part or the industrial automation equipment 16 is available, or the like.

Additionally, in some embodiments, the cloud-based computing system 28 may determine operational parameters associated with a facility in which the industrial automation equipment 16 is located by searching its storage component using the identity of the industrial automation equipment 16 and/or identity of the facility. For example, the cloud-based computing system 28 may search its storage component 40 to determine facility component counts (block 118). In some embodiments, the component counts may include the number of a particular industrial automation equipment 16 in the facility and/or a total number of the industrial automation equipment 16 in the facility. Additionally, the cloud-based computing system 28 may search its storage component 40 to determine a facility layout (block 120). In some embodiments, the facility layout may include physical layout of the facility, electrical layout of the facility, material movement layout of the facility, or the like. Furthermore, the cloud-based computing system 28 may also search its storage component to determine facility status (block 122). In some embodiments, the facility status may include information regarding whether the facility is in operation, whether the facility is functioning properly, whether the facility is obsolete, or the like.

Moreover, the cloud-based computing system 28 may search its storage component 40 to determine a physical location of the facility. Based on the physical location, the cloud-based computing system 28 may search its storage component 40 (e.g., resources 54) to determine external (e.g., environmental) conditions surrounding the facility. For example, the cloud-based computing system 28 may determine that a storm is approaching the facility.

Additionally, the cloud-based computing system 28 may determine whether procedure instructions are desired (block 104). In some embodiments, the cloud-based computing system 28 may receive an indication that the procedure instructions are desired from the mobile computing device 26. For example, in such embodiments, the second user may input a request (e.g., via digital signal) to the mobile computing device 26 when procedure instructions are desired. The mobile computing device 26 may then communicate the request to the mobile computing device 26 via the communication network 30. Based on the received request, the cloud-based computing system 28 may determine that procedure instructions are desired.

When procedure instructions are desired, the cloud-based computing system 28 may determine the procedure instructions (block 106). In some embodiments, the cloud-based computing system 28 may store associations between the industrial automation equipment 16 and related procedure instructions. Additionally, in some embodiments, the cloud-based computing system 28 may receive the procedure instructions from the industrial automation equipment 16 in a facility, a manufacturer, another computing device 26, or any combination thereof.

Accordingly, in such embodiments, the cloud-based computing system 28 may leverage the automated searching capabilities to facilitate determining the procedure instructions, thereby improving efficiency. More specifically, the cloud-based computing system 28 may determine procedure instructions associated with the industrial automation equipment 16 by searching its storage component using at least the identity of the industrial automation equipment 16. For example, the cloud-based computing system 28 may search its storage component 40 to determine lockout-tagout (LOTO) procedure instructions (block 126).

As discussed above, the procedure instructions may include steps in the procedure, location of the industrial automation equipment 16, tools/safety equipment to use, documentation requirements, and the like. Accordingly, continuing with the LOTO procedure instructions example, the cloud-based computing system 28 may determine steps on how to disconnect the industrial automation equipment 16, where to put tags indicating the lockout, location of the industrial automation equipment 16, tools to use to disconnect the industrial automation equipment 16, safety equipment to use, and the like. In a similar manner, the cloud-based computing system 28 may also facilitate automated determination of service procedure instructions, maintenance procedure instructions, and/or troubleshooting procedure instructions (block 128).

The cloud-based computing system 28 may also determine the procedure instructions based at least in part on operational parameter information. More specifically, the operational parameter information may provide context used by the cloud-based computing system 28 to determine the procedure instructions. For example, the cloud-based computing system 28 may determine procedure instructions that include directions steps to guide the user from a current physical location to an end physical location, such as the location of the industrial automation equipment 16 (block 130). Accordingly, the cloud-based computing system 28 may determine the directions steps based at least in part on the location of the industrial automation equipment 16, the location of the user, and the facility layout.

Figures 8, 9, 10:
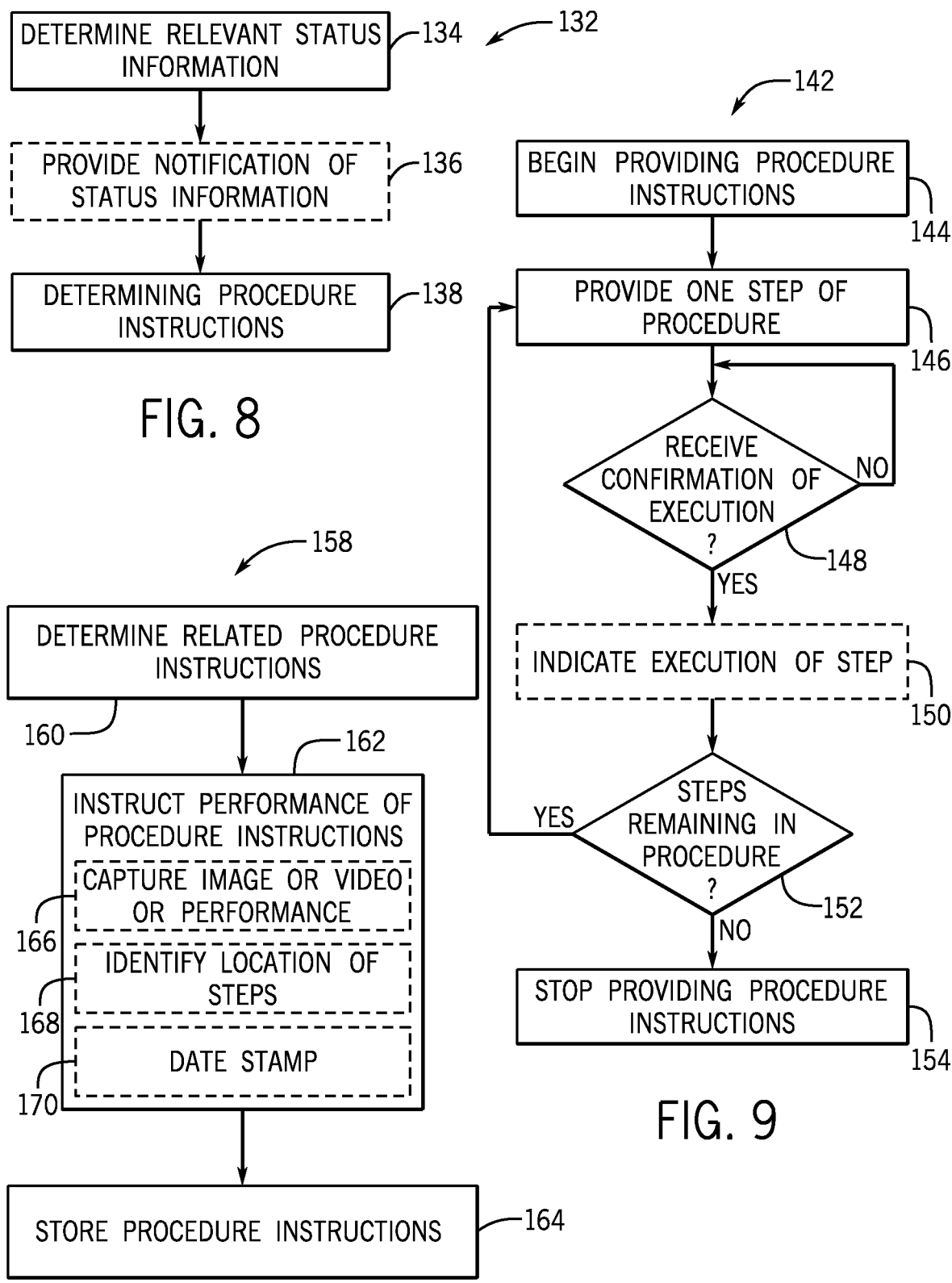
FIG. 8 is a flow diagram of a method for determining procedure instructions, in accordance with embodiments presented herein.
FIG. 9 is a flow diagram of a method for tracking execution of procedure instructions, in accordance with an embodiment presented herein.
FIG. 10 is a flow diagram of a method for generating and/or updating procedure instructions, in accordance with an embodiment presented herein.

FIG. 8 is a flow diagram of a method for determining procedure instructions, in accordance with embodiments presented herein. Generally, the method 132 includes determining relevant operational parameter information (block 134), optionally providing a notification of the relevant operational parameter information (block 136), and determining procedure instructions based at least in part on the relevant operational parameter information (block 138). In some embodiments, the method 132 may be implemented by instructions stored in a tangible, non-transitory, computer-readable medium, such as the memory 38 or the storage component 40, and executable by processing circuitry, such as processor 36.

Accordingly, in such embodiments, the method 132 may be implemented by one or more computing devices 26. To simplify the following discussion, the method 132 will be described in relation to a mobile computing device 26 (e.g., a second computing device 26) and a cloud-based computing system 28 (e.g., a first computing device 26). However, one of ordinary skill in the art should recognize that the method 132 may be implemented by any combination of suitable computing devices 26.

For example, a cloud-based computing system 28 may determine operational parameter information relevant to determining procedure instructions (block 134). More specifically, the cloud-based computing system 28 may determine what operational parameter information is relevant to the user based at least in part on the desired procedure instructions. In some embodiments, the operational parameter information may provide context to generate the procedure instructions. For example, when determining procedure instructions to the user from a current physical location to a desired physical location, the cloud-based computing system 28 may determine that the relevant operational parameter information, such as location of the industrial automation equipment 16 and facility layout information, used to generate direction steps in the procedure instructions.

In other embodiments, the operational parameter information may provide context regarding when specific procedure instructions should be determined. For example, when external conditions indicate that a storm is approaching the facility, the cloud-based computing system 28 may determine lockout-tagout (LOTO) procedure instructions to facilitate shutting down the industrial automation equipment 16. In certain embodiments, the industrial automation equipment 16 may provide LOTO procedures involved with shutting itself down to the cloud-based computing system 28 or other communication network 30-connected devices. Additionally, when the industrial automation equipment 16 status indicates that the firmware/software is out of date (e.g., obsolete), the cloud-based computing system 28 may determine service procedure instructions to update the firmware/software of the industrial automation equipment 16. Furthermore, when the industrial automation equipment 16 status indicates that parts for the automation are in limited supply (e.g., obsolete), the cloud-based computing system 28 may determine replacement parts to use in the industrial automation equipment 16.

In some embodiments, the cloud-based computing system 28 may determine that procedures (e.g., maintenance, service, LOTO) related to the industrial automation equipment 16 may be out of date or may benefit from an update. As such, the cloud-computing system 27 may provide information to the mobile computing device 26 to acquire updated image data and/or audio data for various steps used in the procedures. The cloud-based computing system 28 may then update the procedures, related software applications, and/or related electronic documents regarding the industrial automation equipment 16.

In some embodiments, the cloud-based computing system 28 may facilitate providing a notification of the relevant operational parameter information (block 136). For example, in some embodiments, the cloud-based computing system 28 may communicate the relevant operational parameter information to the mobile computing device 26, for example, via the communication network 30. The mobile computing device 26 may then provide a notification to the user by displaying the relevant operational parameter information (e.g., as virtual objects) on its display 48. For example, with regard to directions, the mobile computing device 26 may display the location of the industrial automation equipment 16 and/or direction steps to travel from the current location of the mobile computing device 26 to the location of the industrial automation equipment 16. Additionally, the mobile computing device 26 may display a virtual object indicating a location of the industrial automation equipment 16 that may be of interest. For example, when viewing the image data being acquired by the mobile computing device 26, a virtual object may highlight the industrial automation equipment 16 of interest by adding a color to highlight real object representation of the industrial automation equipment 16. Additionally, if the industrial automation equipment 16 of interest is out of the view of the display of the industrial automation equipment 16, a virtual object indicating an arrow or direction in which the industrial automation equipment 16 may be located may be added to the display.

Based on the relevant operational parameter information, the cloud-based computing system 28 may determine procedure instructions (block 138). In some embodiments, the cloud-based computing system 28 may store associations between the relevant operational parameter information and procedure instructions in its storage component 40 (e.g., database 52). Accordingly, in such embodiments, the cloud-based computing system 28 may leverage its automated searching capabilities to facilitate determining the procedure instructions, thereby improving efficiency.

Thus, in some embodiments, the cloud-based computing system 28 may determine the procedure instructions by searching its storage component 40 using at least the relevant operational parameter information. For example, the cloud-based computing system 28 may search its storage component 40 using the indication of an approaching storm to determine LOTO procedure instructions for the industrial automation equipment 16 that may not operate properly when certain storm conditions are present.

Additionally, in some embodiments, the cloud-based computing system 28 may analyze the relevant operational parameter information to determine the procedure instructions. For example, when determining direction steps in procedure instructions, the cloud-based computing system 28 may analyze the current location of the industrial automation equipment 16 and the location of the mobile computing device 26. More specifically, in some embodiments, the cloud-based computing system 28 may analyze the locations to determine the location of the industrial automation equipment 16 relative to the current location of the mobile computing device 26. Based on this analysis, the cloud-based computing system 28 may determine directions steps that may be performed to move from the current location of the mobile computing device 26 to the location of the industrial automation equipment 16. In this manner, the relevant operational parameter information may provide context (e.g., relative locations) used to determine the procedure instructions.

Returning to the method 94 of FIG. 7, the cloud-based computing system 28 may also enable tracking execution progress of the procedure instructions (process block 140). For example, in some embodiments, the cloud-based computing system 28 may provide the procedure instructions to the mobile computing device 26 one step at a time. More specifically, the cloud-based computing system 28 may wait for confirmation from the mobile computing device 26, the industrial automation equipment 16, or the user that a step in the procedure instructions is completed before providing a next step in the procedure instructions. In this manner, the cloud-based computing system 28 may keep track of what steps have been properly executed and, thus, the execution progress of the procedure instructions.

FIG. 9 is a flow diagram of a method for tracking execution of procedure instructions, in accordance with an embodiment presented herein. Generally, the method 142 includes beginning to provide procedure instructions (block 144), providing one step of the procedure instructions (block 146), determining whether a confirmation of execution has been received (block 148), optionally indicating execution of the step when confirmation of execution has been received (block 150), determining whether any steps remain in the procedure instructions (block 152), and stop providing procedure instructions when steps do not remain in the procedure instructions (block 154). In some embodiments, the method 142 may be implemented by instructions stored in a tangible, non-transitory, computer-readable medium, such as the memory 38 or the storage component 40, and executable by processing circuitry, such as processor 36.

Accordingly, in such embodiments, the method 142 may be implemented by one or more computing devices 26. To simplify the following discussion, the method 142 will be described in relation to a mobile computing device 26 (e.g., a second computing device 26) and a cloud-based computing system 28 (e.g., a first computing device 26). However, one of ordinary skill in the art should recognize that the method 142 may be implemented by any combination of suitable computing devices 26.

For example, the cloud-based computing system 28 may begin transmitting procedure instructions (block 144) to the mobile computing device 26. More specifically, the cloud-based computing system 28 may begin transmitting the procedure instructions after determining the procedure instructions, for example, by searching its storage component 40 (e.g., database 52).

After determining the procedure instructions, the cloud-based computing system 28 may transmit a step of the procedure instructions (block 146) to the mobile computing device 26. In some embodiments, the cloud-based computing system 28 may transmit the step of the procedure instruction to the mobile computing device 26 via the communication network 30. The mobile computing device 26 may then facilitate execution of the step of the procedure instructions. In some embodiments, the mobile computing device 26 may execute the step in an automated manner. Additionally, in some embodiments, the mobile computing device 26 may request its user to execute the step of the procedure instructions, for example, by displaying a prompt (e.g., as a virtual object) on its display 48.

The cloud-based computing system 28 may then wait to receive confirmation of successful execution of the step (block 148). In some embodiments, the cloud-based computing system 28 may wait for a signal transmitted from the mobile computing device 26 to indicate that the step has been successfully executed. For example, when the mobile computing device 26 executes the step in an automated manner, the mobile computing device 26 may automatically transmit the signal to the cloud-based computing system 28 upon completion of each step. On the other hand, when the user is involved in executing the step, the mobile computing device 26 may receive a user input indicating successful execution and automatically transmit the signal to the cloud-based computing system 28.

In some embodiments, the signal may indicate successful completion of the step. In other embodiments, the signal may include image data and/or audio data captured during execution of the step. In such embodiments, the cloud-based computing system 28 may analyze the captured image data and/or audio data to determine whether the step has been properly executed. In this manner, the cloud-based computing system 28 may ensure execution quality of the procedure instructions.

Once execution confirmation is received, the cloud-based computing system 28 may optionally indicate execution of the step (block 150) to one or more users 32. For example, the cloud-based computing system 28 may display a graphical object (e.g., a virtual object) on its display 48 to indicate execution of the step. Additionally, in some embodiments, the cloud-based computing system 28 may transmit an indication of the execution to another computing device 26 via the communication network 30. In this manner, the cloud-based computing system 28 may enable users 32 and/or other computing devices 26 to also keep track of execution progress.

To help illustrate, in lockout-tagout context, multiple users 32 (e.g., operators) may work together to disable multiple industrial automation equipment 16. For example, in a lockout-tagout procedure, a first user and a second user may be responsible for disabling a total of ten different industrial automation equipment 16. To facilitate keeping track of progress, the first user may have a first mobile computing device 26 and the second user may have a second computing device 26 that each displays a list of the ten different industrial automation equipment 16.

For example, when the first user successfully disables a motor (e.g., the industrial automation equipment 16), the first user may indicate completion by selecting a motor entry displayed on the first computing device 32. The first computing device 32 may then communicate (e.g., directly or via the cloud-based computing system 28) the disabling of the motor to the second computing device 32 and the second computing device 32 may visually indicate that the motor has been disabled, for example, by striking out the motor entry on the second computing device 32. In this manner, the computing devices 26 may enable multiple users 32 to keep track of the overall progress of the lockout-tagout procedure, thereby reducing the likelihood of duplicate efforts.

The cloud-based computing system 28 may then determine whether there are any remaining steps in the procedure instructions (block 152). If steps remain, the cloud-based computing system 28 may provide the next step in the procedure instructions to the mobile computing device 26 (block 146). On the other hand, if no steps remain, the cloud-based computing system 28 may stop providing the procedure instructions (block 154). In this manner, execution progress of procedure instructions may be tracked.

Returning to the method 94 of FIG. 7, the cloud-based computing system 28 may also facilitate creating/updating procedure instructions (block 156). More specifically, the cloud-based computing system 28 may create procedure instructions when the cloud-based computing system 28 is unable to determine a requested procedure instruction and/or in response to receiving a request to create procedure instructions. Additionally, the cloud-based computing system 28 may update procedure instructions periodically and/or in response to receiving a request to update procedure instructions.

FIG. 10 is a flow diagram of a method for generating and/or updating procedure instructions, in accordance with an embodiment presented herein. Generally, the method 158 includes determining related procedure instructions (block 160), instructing performance of the related procedure instructions (block 162), and storing procedure instructions (block 164). In some embodiments, the method 158 may be implemented by instructions stored in a tangible, non-transitory, computer-readable medium, such as the memory 38 or the storage component 40, and executable by processing circuitry, such as processor 36.

Accordingly, in such embodiments, the method 158 may be implemented by one or more computing devices 26. To simplify the following discussion, the method 158 will be described in relation to a mobile computing device 26 (e.g., a second computing device 26) and a cloud-based computing system 28 (e.g., a first computing device 26). However, one of ordinary skill in the art should recognize that the method 158 may be implemented by any combination of suitable computing devices 26.

For example, the cloud-based computing system 28 may determine related procedure instructions (block 160). More specifically, when creating procedure instructions, the related procedure instructions may include default procedure instructions, which may be generally applicable without accounting for implementation in the specific industrial automation system. For example, default lockout-tagout (LOTO) procedure instructions may indicate generally where lockout points should be located on the industrial automation equipment 16. Accordingly, in some embodiments, the default procedure instructions may be provided by a manufacturer and/or the industrial automation equipment 16.

When updating the procedure instructions, the related procedure instructions may include a previous version of the procedure instructions. In some embodiments, a storage component 40 (e.g., database 52) may store procedure instructions. Accordingly, in such embodiments, the cloud-based computing system 28 may determine a previous version of procedure instructions by searching the storage component (e.g., database 52), for example, based on the identity of the industrial automation equipment 16 and/or a facility. Additionally, in some embodiments, the industrial automation equipment 16 may store procedure instructions related to the industrial automation equipment 16. Accordingly, in such embodiments, the cloud-based computing system 28 may receive a previous version of procedure instructions from the industrial automation equipment 16.

The cloud-based computing system 28 may then instruct execution of steps in the related procedure instructions (block 162). In some embodiments, the cloud-based computing system 28 may transmit steps in the related procedure instructions to the mobile computing device 26 via the communication network 30. The mobile computing device 26 may then facilitate execution of the steps in the related procedure instructions. In some embodiments, the mobile computing device 26 may execute steps of the related procedure instructions in an automated manner upon receipt. For example, when audit procedure instructions are received, the mobile computing device 26 may execute steps in the procedure instructions to perform an audit on the industrial automation equipment 16. Additionally, in some embodiments, the mobile computing device 26 may request its user to execute steps in the related procedure instructions by displaying a prompt (e.g., as a virtual object) on its display 48. For example, when lockout-tagout procedure instructions are received, the mobile computing device 26 may display a prompt instructing a user to place a tag at a specific place on the industrial automation equipment 16.

To facilitate creating/updating the procedure instructions, the cloud-based computing system 28 may instruct the mobile computing device 26 to capture relevant information during the execution of the related procedure instructions. For example, the cloud-based computing system 28 may instruct the mobile computing device 26 to capture a visual representation of the performance of each step as image data and/or an audio representation of the performance of each step as audio data (block 166), to identify location where each step is performed (block 168), and/or to date stamp the image data and/or audio data (block 170).

The cloud-based computing system 28 may utilize the relevant information captured during the execution of the related procedure instruction to create/update the desired procedure instructions. More specifically, the relevant information (e.g., image data and/or location) may provide the context used to tailor the procedure instructions to the implementation in the specific industrial automation system.

As such, the cloud-based computing system 28 may create/update the procedure instructions by storing the related information (block 164), for example, in its storage component 40. For instance, when the procedure instructions are subsequently determined, the cloud-based computing system 28 may display corresponding visual representations via its display before a user performs each step, thereby improving the likelihood of properly performing the step. Additionally, date stamping may provide context into when the image data and/or audio data was captured. More specifically, the date stamp may provide an indication of when the procedure instructions were created, thereby providing a reference date for when to subsequently update the procedure instructions. To facilitate subsequent retrieval, the cloud-based computing system 28 may store an association between the procedure instructions with the identity of the industrial automation equipment 16, identity of a facility, operational parameter information, or the like. In certain embodiments, the date stamps may be used to update image data and/or audio data that may be stored in a storage component. That is, if the date stamp indicates that the previously stored image data and/or audio data older than some age, the cloud-based computing system 28 may replace or update the previous image data and/or audio data with the recently acquired versions of such.

Returning to the method 94 of FIG. 7, the cloud-based computing system 28 may also determine whether an automated assessment is desired (block 108). As used herein, an "automated assessment" is intended to describe an assessment (e.g., an audit) performed on the industrial automation equipment 16 by a computing devices 26 in an automated manner.

In some embodiments, as discussed above, the cloud-based computing system 28 may receive an indication regarding whether an automated assessment is desired from the mobile computing device 26. For example, in such embodiments, the second user may input a request (e.g., as digital signal) to the mobile computing device 26 when automated assessment is desired. The mobile computing device 26 may then communicate the request to the cloud-based computing system 28 via the communication network 30. Based on the received request, the cloud-based computing system 28 may determine that operational parameter information is desired.

When an automated assessment is desired, the cloud-based computing system 28 may determine the assessment information (block 110). More specifically, the assessment information may include results of an assessment performed on the industrial automation equipment 16 and/or the industrial automation system. In some embodiments, the assessment may be previously performed and the results of the previously performed assessment may be stored in the storage component 40 of the cloud-based computing system 28.

Additionally, in some embodiments, the assessment may be performed in response to determination that automated assessment is desired. In such embodiments, the cloud-based computing system 28 may perform the assessment by executing procedure instructions. For example, the cloud-based computing system 28 may execute procedure instructions to perform various audits on the industrial automation equipment 16. Thus, in such embodiments, the cloud-based computing system 28 may determine procedure instructions executed to perform the assessment, for example, using the techniques described above.

In some embodiments, the cloud-based computing system 28 may store associations between the assessment results (e.g., recommendations and/or audit results) with identities of the industrial automation equipment 16 and/or other operational parameter information in its storage component 40 (e.g., database 52). Accordingly, in such embodiments, the cloud-based computing system 28 may leverage its automated searching capabilities to facilitate determining the assessment results, thereby improving efficiency.

Thus, in some embodiments, the cloud-based computing system 28 may determine the desired assessment information by searching its storage component 40 using the identity of the industrial automation equipment 16 and/or operational parameters to determine relevant assessment information. For example, the cloud-based computing system 28 may search its storage component 40 based on the identity of the industrial automation equipment 16 to determine recommendations for parts associated with the identified the industrial automation equipment 16 (block 176). In some embodiments, the recommendations for parts may identify parts that are compatible with the industrial automation equipment 16 and/or parts that can be used to replace existing parts in the industrial automation equipment 16. Accordingly, in some embodiments, the cloud-based computing system 28 may receive recommendations for parts from the industrial automation equipment 16.

Additionally, the cloud-based computing system 28 may search its storage component 40 based on facility layout to determine optimization recommendations (block 174). In some embodiments, the optimization recommendations may include operational adjustments to the industrial automation equipment 16 that facilitate operation of the facility. Additionally, in some embodiments, the optimization recommendations may include adjustments to the location of the industrial automation equipment 16 that facilitate interoperation or interconnections within the industrial automation system or the communication network 30.

Furthermore, the cloud-based computing system 28 may search its storage component 40 based on the industrial automation equipment 16 status and/or the facility status to determine service recommendations (block 172). In some embodiments, the service recommendations may include services that may be performed in the industrial automation system. For example, the service recommendations may include updating services that update firmware/software and/or parts of the industrial automation equipment 16 when its corresponding industrial automation equipment status is obsolete. Thus, the cloud-based computing system 28 may facilitate determining the relevant assessment information in an automated manner.

In addition to the assessment results, the relevant assessment information may include quotes for implementing any of the recommendations. In some embodiments, the cloud-based computing system 28 may store associations between recommendations and estimated corresponding costs, which may include parts, parts costs, service costs, labor costs, and the like in its storage component 40 (e.g., database 52). Accordingly, in such embodiments, the cloud-based computing system 28 may leverage its automated searching capabilities to facilitate determining a quote corresponding to a provided recommendation, thereby improving efficiency. Thus, in some embodiments, the cloud-based computing system 28 may determine a corresponding quote (block 178) by searching its storage component 40 based on the provided recommendation.

The relevant assessment information may also include options for implementing any of the recommendations. For example, the cloud-based computing system 28 may provide contact information for a service professional capable of implementing the recommendation (block 180). Additionally, the cloud-based computing system 28 may determine procedure instructions that may be executed, for example by a user or the mobile computing device 26, to implement the recommendation (block 182). In some embodiments, the first computing device 26 may store associations between recommendations and options for implementation (e.g., service professional contact information and/or associated procedure instructions) in its storage component 40 (e.g., database 52). Thus, in some embodiments, the cloud-based computing system 28 may determine an option for implementing a recommendation by searching its storage component 40 based on the provided recommendation.

The cloud-based computing system 28 may then transmit the identity of the industrial automation equipment 16, operational parameter information when desired, procedure instructions when desired, and automated assessment information when desired (e.g., relevant information) (block 112). In some embodiments, the cloud-based computing system 28 may transmit the relevant information to the mobile computing device 26 via the communication network 30.

Based on the received relevant information, the mobile computing device 26 may then perform various operations. For example, the mobile computing device 26 may provide the identity, operational parameters, assessment, and/or procedure instructions to the second user by displaying graphical objects (e.g., virtual objects) on its display 48. Additionally, the mobile computing device 26 may execute the procedure instructions to, for example, instruct the industrial automation equipment 16 to perform a control action, run a troubleshooting procedure on the industrial automation equipment 16, and/or perform an audit on the industrial automation system.

In this manner, image data capturing a visual representation of a portion of an industrial automation system and/or audio data capturing an audio representation of the portion of the industrial automation system may enable the a computing device 26 to leverage its automated searching capabilities and determine relevant information (e.g., identity, operational parameters, assessment, and/or procedure instructions) in an automated manner. As such, efficiency associated with the determining the relevant information may be facilitated, for example, by increasing speed with which the relevant information is determined. In this manner, communication of relevant information in the industrial automation system may be facilitated by enabling remote and/or automated determination of the relevant information.

Presentation of Relevant Information

As discussed above, the communication of relevant material may also be facilitated by improving the presentation, for example, to a user. In some embodiments, a computing device 26 may facilitate presentation of relevant information by displaying virtual objects superimposed on real objects. More specifically, the real objects may be a visual representation of physical features of the facility, such as the industrial automation equipment 16. Additionally, the virtual objects may be a visual representation of nonphysical features of the industrial automation equipment 16 or the industrial automation system, such text indicating operational parameters of the industrial automation equipment 16

Figure 11:
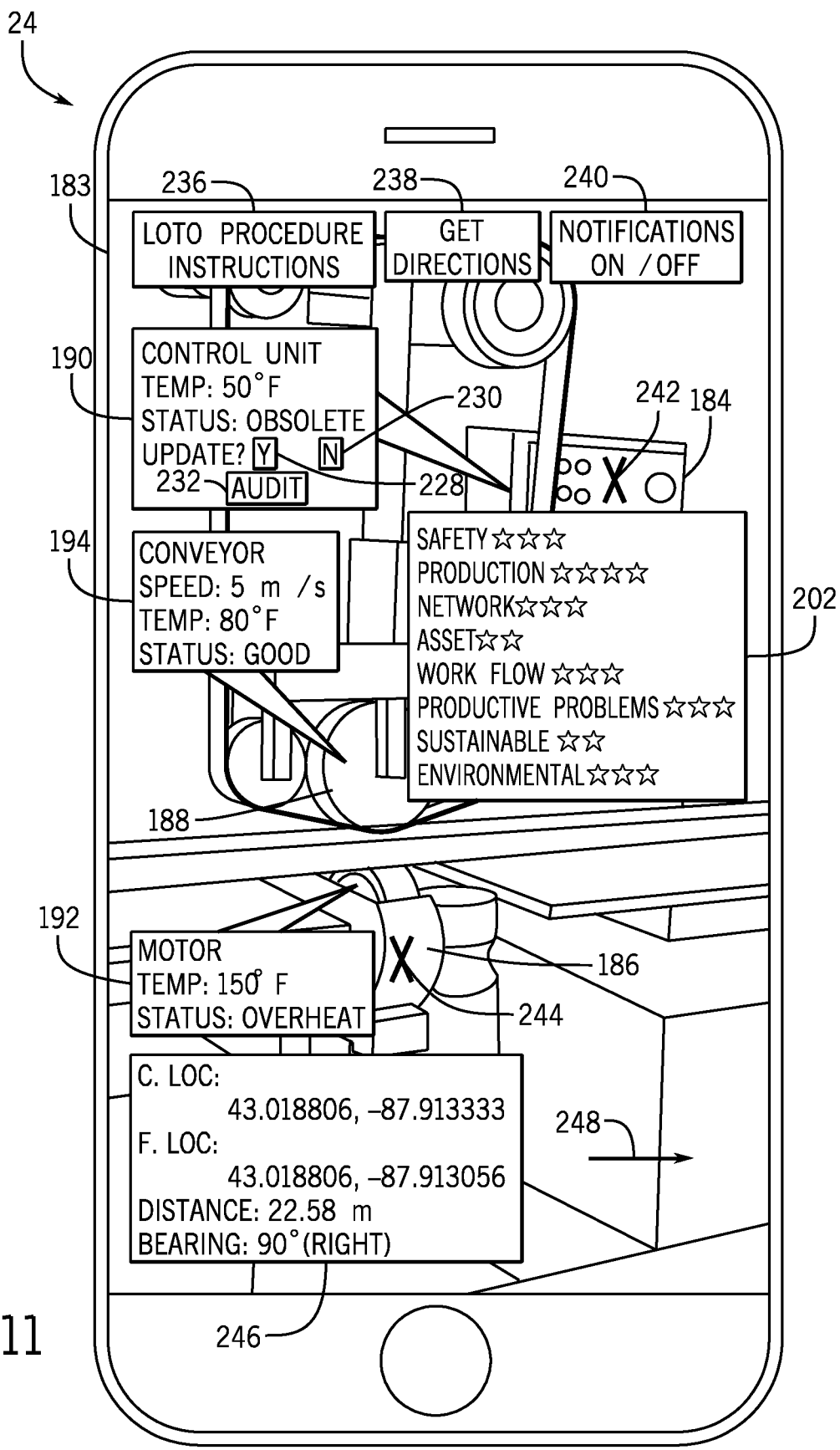
FIG. 11 is a screen capture of a display, in accordance with embodiments presented herein.

FIG. 11 is a screen capture of a display, in accordance with embodiments presented herein. To simplify the following discussion, the display 183 will be described in relation to a mobile computing device 26 (e.g., a computing device 26). However, one of ordinary skill in the art should recognize that the display 183 may be implemented by any suitable type of computing device 26.

In the depicted embodiment, the display 183 depicts a portion of the facility as real objects, which in the depicted embodiment includes a control unit real object 184, a motor real object 186, and a conveyor real object 188. The control unit real object 184, the motor real object 186, and the conveyor real object 188 may be image data capturing a control unit industrial automation equipment 16, a motor industrial automation equipment 16, and a conveyer industrial automation equipment 16, respectively. Accordingly, in some embodiments, the mobile computing device 26 may capture a visual representation used to display the real objects via its image sensor 44. Additionally, in some embodiments, the mobile computing device 26 may receive the real objects from a cloud-based computing system 28 (e.g., a computing device 26) via the communication network 30, for example, based at least in part on the location and orientation of the mobile computing device 26 relative to the facility and/or one or more of the industrial automation equipment 16. That is, the cloud-based computing system 28 may provide real objects to display on the display 183 via additional image sensors disposed throughout the facility.

In addition to the real objects, the display 183 illustrated in FIG. 11 also depicts various virtual objects. More specifically, some virtual objects may be displayed to present relevant information adjacent to a real object representation of corresponding industrial automation equipment 16. For example, in the depicted embodiment, the display 183 displays a motor virtual object 192 adjacent to the motor real object 186 with text to indicate the identity, temperature, and status of the motor. Similarly, the display 183 displays a conveyor virtual object 194 adjacent the conveyor real object 188 with text to indicate the identity, speed, temperature, and status of the conveyor. Furthermore, the display 183 displays a control unit virtual object 190 adjacent to the control unit real object 184 with text to indicate the identity, temperature, and status of the control unit.

As described above, the virtual objects may facilitate remote and/or automated determination of relevant information. For example, the virtual objects may provide additional relevant information to a user to help the user determine identity, procedure instructions, and/or assessment information. It should be appreciated that the relevant information provided in the virtual objects is merely intended to be illustrative. As such, in other embodiments, the virtual objects may provide other types of relevant information.

FIG. 12 is a flow diagram describing a method for displaying real objects and virtual objects on the display, in accordance with embodiments presented herein. Generally, the method 196 includes determining a location and orientation of a computing device (block 198), displaying real objects proximate the computing device (block 200), determining relevant information to the real objects (block 202), and displaying the relevant information as virtual objects superimposed on the real objects (block 204). In some embodiments, the method 196 may be implemented by instructions stored in a tangible, non-transitory, computer-readable medium, such as the memory 38 or the storage component 40, and executable by processing circuitry, such as processor 36.

Accordingly, in such embodiments, the method 196 may be implemented by one or more computing devices 26. To simplify the following discussion, the method 196 will be described in relation to a mobile computing device 26 (e.g., a second computing device 26) and a cloud-based computing system 28 (e.g., a first computing device 26). However, one of ordinary skill in the art should recognize that the method 196 may be implemented by any combination of suitable computing devices 26.

For example, a mobile computing device 26 may determine its location and its orientation (block 198) with respect to the facility and/or one or more of the industrial automation equipment 16. In some embodiments, the mobile computing device 26 may determine its location and its orientation based on captured image data. More specifically, the mobile computing device 26 may communicate captured image data to a cloud-based computing system 28 via the communication network 30. As described above, the cloud-based computing system 28 may determine physical dimensions, shapes, or other geometrical information regarding physical features captured by the image data. Accordingly, in some embodiments, the cloud-based system 27 may determine the location and orientation that would have resulted in the image data. The cloud computing system 28 may then communicate the location and orientation and/or identity of captured physical features back to the mobile computing device 26 via the communication network 30. In other embodiments, the mobile computing device 26 may determine its location and orientation using its location sensor 46 (block 208).

The mobile computing device 26 may then depict real objects to visually represent its surroundings (block 200). In some embodiments, the real objects may be based on image data capturing the surroundings proximate the mobile computing device 26 (block 210). For example, the mobile computing device 26 may display a visual representation presently captured by its image sensor 44, in which visual representations of physical features (e.g., the industrial automation equipment 16) are real objects. In other embodiments, the real objects may be based on a previously captured visual representation, such as image data or a 3D representation (blocks 210 and 211).

FIG. 13 is a flow diagram describing a method for capturing visual representations used to display real objects, in accordance with embodiments presented herein. Generally, the method 212 includes receiving a visual representation of physical features (block 214), determining location and orientation associated with visual representation of the physical features (block 216), and storing an association of the physical features with corresponding location and orientation (block 218). In some embodiments, the method 212 may be implemented by instructions stored in a tangible, non-transitory, computer-readable medium, such as the memory 38 or the storage component 40, and executable by processing circuitry, such as processor 36.

Accordingly, in such embodiments, the method 212 may be implemented by one or more computing devices 26. To simplify the following discussion, the method 212 will be described in relation to a mobile computing device 26 (e.g., a second computing device 26) and a cloud-based computing system 28 (e.g., a first computing device 26). However, one of ordinary skill in the art should recognize that the method 212 may be implemented by any combination of suitable computing devices 26.

For example, the cloud-based computing system 28 may receive a captured visual representation of physical features (block 214). In some embodiments, the cloud-based computing system 28 may receive the captured visual representation from another computing device 26 that captured the visual representation via the communication network 30. For example, the visual representation may be captured as image data by an image sensor 44 of the other computing device 26. Additionally, the visual representation may be a three-dimensional (3D) representation of the facility determined by a 3D scan of the facility to capture the 3D contours of the physical features, such as the 3D shape of industrial automation equipment 16. The 3D visual representation may facilitate training users 32 regarding the operation and/or layout of the facility.

Additionally, a location sensor 46 may determine the location and orientation associated with the captured visual representation (block 216). More specifically, the location and orientation may indicate the location and orientation of the computing device 26 relative to physical features when the computing device 26 captured the visual representation. In other words, the determined location and orientation may provide context into where the visual representation was captured. As such, the second computing device 46 may the store associations between the captured visual representation and the determined location and orientation (block 218), for example, in its storage component 40 (e.g., database 52). In this manner, the second computing device 46 may search its storage component 40 based at least in part on location and orientation of the mobile computing device 26 to determine what physical features should be proximate the mobile computing device 26.

As such, returning to the method 196 described in FIG. 12, the cloud-based computing system 28 may determine physical features proximate to the mobile computing device 26, for example, by searching its storage component 40 (e.g., database 52) based on the location and orientation of the mobile computing device 26. The cloud-based computing system 28 may then communicate the associated previously captured visual representation (e.g., image data or 3D representation) to the mobile computing device 26, for example, via the communication network 30. Based at least in part on the received previously captured visual representation, the mobile computing device 26 may then depict real objects to represent the proximate physical features.

In some embodiments, the real objects may facilitate presenting visual representations of physical features that may not be directly visible to a user of the mobile computing device 26. For example, when the image sensor 44 captures the industrial automation equipment 16, the mobile computing device 26 may display real objects to visually represent internal components of the industrial automation equipment 16. In some embodiments, the real objects may be displayed based at least in part on known internal components of the industrial automation equipment 16 and/or previously captured image data of the internal components. That is, for example, the cloud-based computing system 28 may provide image data regarding internal components or other relevant image data regarding the industrial automation equipment 16 being viewed. In this manner, the mobile computing device 26 may enable a user to view the internal components without physically opening the industrial automation equipment 16, which may be particularly useful in high power equipment.

To further illustrate, based on the location and orientation, the mobile computing device 26 may display real objects to visually represent the industrial automation equipment 16 that may be obstructed from view by other physical features. For instance, when displaying a desired industrial automation equipment 16 that is out of sight of the image sensor 44 due to the presence of other industrial automation equipment 16, a wall, or the like. The mobile computing device 26 may generate a visualization indicating an outline of the obstruction and provide a view through the obstruction to view the desired industrial automation equipment 16. As such, the real objects may be displayed based at least in part on previously captured image data, such as image data captured by a three-dimensional scan of the facility or by image data acquired by other image sensors disposed throughout a facility. Additionally, the mobile computing device may provide a visualization, such as a glowing or pulsating virtual object, from a direction that corresponds to the desired industrial automation equipment 16. In this manner, the mobile computing device 26 may enable a user to visualize the location of the industrial automation equipment 16 even when otherwise obstructed from view.

Additionally, the mobile computing device 26 may determine information relevant to the depicted real objects (block 202). In some embodiments, the mobile computing device 26 may receive the relevant information from the cloud-based computing system 28 or sensors 16 via the communication network 30. As described above, the relevant information may include operational parameters, procedure instructions, and/or assessment information. Accordingly, in some embodiments, the mobile computing device 26 may determine operational parameter information related to a displayed real object, which corresponds with the industrial automation equipment 16. For example, to determine the operational parameters information, the mobile computing device 26 may poll sensors 16 in the industrial automation system that measure desired operational parameters. In response, the sensors 16 may return the desired operational parameters to the mobile computing device 26. Additionally, in some embodiments, the mobile computing device 26 may receive the operational parameter information from the cloud-based computing system 28 using the techniques described above.

Using the techniques described above, the mobile computing device 26 may also determine relevant procedure instructions (block 222) and/or determine relevant assessment information (block 224) in a remote and/or automated manner. For example, as described above, the mobile computing device 26 may capture identifying information (e.g., image data) and communicate the identifying information to the cloud-based computing system 28 via the communication network 30. Based at least in part on the identifying information, the cloud-based computing system 28 may determine the relevant information in an automated manner by searching its storage component 40 (e.g., database 52) and/or in a remote manner by receiving inputs from a user physically remote from the mobile computing device 26.

After determining the relevant information, the mobile computing device 26 may present the relevant information by displaying virtual objects superimposed on the real objects (block 204). For example, as described above, mobile computing device 26 may display the motor virtual object 192 with text to indicate the identity, temperature, and status of the motor; the conveyor virtual object 194 with text to indicate the identity, speed, temperature, and status of the conveyor automation; and the control unit virtual object 190 with text to indicate the identity, temperature, and status of the control unit.

However, as depicted, the virtual objects may cover portions of real objects depicted on the display 183. As such, to conserve screen space of the display 48, some virtual objects may be selectably displayed. In some embodiments, virtual objects may be automatically displayed when the mobile computing device 26 is oriented toward a corresponding industrial automation equipment 16 and located within a certain distance from the industrial automation equipment 16. As such, when the user directs the mobile computing device 26, the image data may be transmitted to the cloud-computing system 27, which may determine relevant information to provide various virtual objects to be depicted on the display 183. For example, virtual objects may be added to the display 183 to indicate the relevant information regarding the industrial automation equipment 16 being viewed, such as obsolete parts, maintenance information, temperature readings, and the like. In certain embodiments, the virtual objects may include measurements from devices monitoring the industrial automation equipment 16 such as temperature sensors, pressure sensors, and the like.

Additionally, some virtual objects may be displayed in response to user interaction with a displayed graphical object (e.g., a real object or a virtual object). In other words, some real objects and some virtual objects may be selectable graphical objects (block 226). For example, with regard to screen capture of the display 183 in FIG. 11, the control unit real object 184 may be a selectable graphical object. Accordingly, in response to a selection of the control unit real object 184, the control unit virtual object 190 may be displayed to provide relevant information to the control unit.

The virtual objects may also be selectable graphical objects. In some embodiments, the selectable graphical objects may be notification virtual objects. Accordingly, returning to the method 196 of FIG. 12, the mobile computing device 26 may display some virtual objects as notification virtual objects (block 241). Generally, to conserve display screen space, a notification virtual object may indicate relevant information on a coarse level.

For example, with regard to the screen capture of the display 183 in FIG. 11, a first notification virtual object 242 is superimposed on the control unit real object 190 since the control unit is obsolete. Similarly, a second notification virtual object 244 is displayed superimposed on the motor real object 186 since the motor automation is overheating. However, to conserve display screen space, the first notification virtual object 242 and the second notification virtual object 244 merely indicate that user attention is desired without providing additional details on the cause. As such, the virtual object 244 may include adding a highlight to the industrial automation equipment 16, pulsating outline of the industrial automation equipment 16, or any other animation effect.

To determine additional detail, the user may select the notification virtual object. For example, in response to a selection of the first notification virtual object 242, the mobile computing device 26 may display the control unit virtual object 190 to indicate that the obsolete status of the control unit automation. Similarly, in response to a selection of the second notification virtual object 244, the mobile computing device 26 may display the motor virtual object 192 to indicate the overheating status of the motor automation In other embodiments, the notification virtual objects may take other forms. In some embodiments, different symbols may be used to indicate additional relevant information. For example, the first notification virtual object 242 may be an "O" to indicate that the control unit is obsolete and the second notification virtual object 244 may be a flame symbol to indicate that the motor industrial automation equipment 186 is overheating. Additionally, colors may be used to indicate additional relevant information. In some embodiments, notification virtual objects may be displayed to change the perceived color of real objects. For example, a heat map may be provided by using notification virtual objects to adjust perceived color of the real objects based on temperature of the corresponding industrial automation equipment 16.

In addition to notification virtual objects, the selectable graphical objects may include button virtual objects. For example, the control unit virtual object 190 includes a Y (e.g., yes) button virtual object 228, an N (e.g., no) button virtual object 230, and an audit button virtual object 232. More specifically, when the audit button virtual object 232 is selected, an audit result virtual object 234 may be displayed to provide results of an audit assessment. In the depicted embodiment, the audit result virtual object 234 provides stars to indicate a safety rating, a production rating, a network rating, an asset rating, a work flow rating, a productive problems rating, a sustainability rating, and/or an environmental rating.

In addition to causing display of virtual objects, selectable graphical objects may also perform other operations in response to selection. For example, when the Y button virtual object 228 is selected, the out of data firmware/software of the industrial automation equipment 16 may be updated and/or replacement parts for parts available in limited supplies may be recommended. On the other hand, when the N button virtual object 230 is selected, the control unit is not updated. Additionally, in the depicted embodiment, the display 183 depicts a LOTO procedure instructions button virtual object 236, a get directions button virtual object 238, and a notifications on/off button virtual object 240. More specifically, when the LOTO procedure instructions button virtual object 238 is selected, the mobile computing device 26 may determine LOTO procedure instructions, for example, using the techniques described above. In some embodiments, the mobile computing device 26 may then present the LOTO procedure instructions as a virtual object. Additionally, the mobile computing device 26 may instruct the industrial automation equipment 16 to execute the LOTO procedure instructions.

Additionally, when the get directions button virtual object 238 is selected, the mobile computing device 26 may determine directions from its current location to location of a target industrial automation equipment. For example, in the depicted embodiment, a direction virtual object 246 and a bearing virtual object 248 are displayed to facilitate guiding a user to a target location. More specifically, the direction virtual object 246 may include the current location of the mobile computing device 26 and the final (e.g., target) location.

The bearing virtual object 248 and the directions virtual object 246 may also present direction procedure instructions to the user. For example, in the depicted embodiment, the bearing virtual object 248 and the directions virtual object 246 indicate that the user should turn to the right and travel 22.58 meters. As the mobile computing device 26 moves, the directions virtual object 246 and the bearing virtual object 248 may be updated. For example, in some embodiments, the direction steps may be presented in a turn-by-turn manner. In other words, each direction step provided one at a time to track execution. As such, the directions virtual object 246 may provide a next direction step upon completion of a previous direction step until reaching the target location. In addition to directions, as mentioned above, the mobile computing device 26 may indicate a relative location of the target location by an arrow or a pulsating portion of the display 183 to indicate a relative direction of the target location with respect to the image data depicted on the display 183. In addition to the directional information, the virtual object may include information regarding the target location, such as its distance, any relevant information regarding the target location or the industrial automation equipment 16 at the target location or within a vicinity of the target location.

Furthermore, the notifications on/off button virtual object 240 may toggle on or off notification virtual objects. For example, when notification virtual objects are being displayed, selection of the notifications on/off button virtual object 240 may turn the notification virtual objects off. On the other hand, when the notification virtual objects are not being displayed, selection of the notifications on/off button virtual object 240 may turn the notification virtual objects on. In this manner, the displayed virtual objects may be adjusted by the user.

In other embodiments, the user may further adjust what virtual objects are displayed. For example, the user may turn off all virtual objects and only display real objects. Additionally, the user may select what types of virtual objects to display and what type of virtual objects not to display. For example, the user may turn on notification virtual objects and turn off industrial automation equipment virtual objects. In this manner, the user may adjust how display screen space is used.

Virtual objects describing relevant information may be displayed superimposed on real objects representing physical features to facilitate presentation of the relevant information. For example, a computing device may indicate relevant information related to the industrial automation equipment 16 by displaying a virtual object with the relevant information adjacent a real object depicting the industrial automation equipment. In this manner, communication of relevant information may be facilitated by improving presentation of the relevant information.

Technical effects of the embodiments described herein include improving communication of relevant information in an industrial automation system. More specifically, communication may be facilitated by enabling remote and/or automated determination of the relevant information. Additionally, communication of relevant information may be facilitated by improving presentation of the relevant information. By improving communication of relevant information, operations and maintenance of the industrial automation system may be performed more efficiently.

In the preceding specification, various embodiments have been described with reference to the accompanying drawings. It will, however, be evident that various modifications and changes may be made thereto, and additional embodiments may be implemented, without departing from the broader scope of the systems and techniques as set forth in the claims that follow. The specification and drawings are accordingly to be regarded in an illustrative rather than restrictive sense.

The invention claimed is:

1. A first computing device in an industrial automation system comprising:
   an image sensor configured to capture one or more images of a portion of a facility as image data;
   a communication component configured to communicatively couple the first computing device to a second computing device via a communication network to enable the first computing device to receive relevant information related to a first industrial automation equipment from the second computing device, wherein the relevant information comprises one or more operational parameters transmitted by one or more sensors associated with the first industrial automation equipment; and
   a display component configured to:
      display a plurality of real objects that depicts physical features in the portion of the facility based at least in part on the image data, wherein the plurality of real objects comprises an obstructing real object depicting a physical obstruction disposed between the image sensor and the first industrial automation equipment in response to the image sensor being oriented toward the first industrial automation equipment, and wherein at least a portion of the first industrial automation equipment is blocked from view of the image sensor by the physical obstruction;
      modify the obstructing real object into an outline of the physical obstruction to present a first virtual object that depicts the first industrial automation equipment within the outline, wherein the first virtual object is generated based at least in part on the operational parameters and is configured to reveal a representation of the first industrial automation equipment through the outline of the physical obstruction within the image data; and
      display a second virtual object superimposed on at least a portion of the plurality of real objects, wherein the second virtual object is generated based at least in part on the relevant information in response to the first computing device being moved within a threshold distance from the first industrial automation equipment and the image sensor being oriented toward the first industrial automation equipment, and wherein the second virtual object comprises at least a portion of the operational parameters.

2. The first computing device of claim 1, comprising a location sensor configured to determine a location of the first computing device with respect to a set of the physical features of the facility, wherein the display component is configured to display the second virtual object superimposed on the at least a portion of the plurality of real objects in response to the first virtual object being displayed.

3. The first computing device of claim 1, wherein the display component is configured to display the second virtual object in response to receiving a user selection of the first virtual object.

4. The first computing device of claim 1, wherein the display component is configured to:
   display a third virtual object superimposed on the first virtual object to provide a notification related to the first industrial automation equipment; and
   display the second virtual object in response to receiving a user selection of the third virtual object.

5. The first computing device of claim 1, wherein the first computing device is configured to communicate the image data to the second computing device to enable the second computing device to determine an identity of the first industrial automation equipment blocked from view of the image sensor by the physical obstruction and to determine the relevant information based at least in part on the identity of the first industrial automation equipment.

6. The first computing device of claim 1, wherein the display component is configured to:
   display a first real object depicting a second industrial automation equipment in the portion of the facility using the image data in response to the image sensor being oriented toward the second industrial automation equipment; and
   display a third virtual object superimposed on at least a portion of the plurality of real objects based at least in part on a set of the relevant information related to the second industrial automation equipment in response to the first computing device being moved within the threshold distance from the second industrial automation equipment and the image sensor being oriented toward the second industrial automation equipment.

7. The first computing device of claim 1, wherein the display component is configured to:
   display a button virtual object superimposed on at least a portion of the plurality of real objects; and
   display a third virtual object superimposed on at least a portion of the plurality of real objects in response to user selection of the button virtual object, wherein the second virtual object is configured to present additional relevant information associated with one of the plurality of real objects.

8. The first computing device of claim 1, wherein the first computing device comprises a mobile computing device configured to be portable about the facility and the display component comprises a touch-sensitive display.

9. The first computing device of claim 1, wherein the first virtual object depicting the first industrial automation equipment through the physical obstruction is based at least in part on previously captured image data of the first industrial automation equipment.

10. The first computing device of claim 1, wherein the first industrial automation equipment comprises an internal component of power equipment, and wherein the physical obstruction comprises a housing of the power equipment.

11. The first computing device of claim 1, wherein the physical obstruction comprises a second industrial equipment.

12. The first computing device of claim 1, wherein the image data comprises image data captured by a three-dimensional scan of the industrial automation system.

13. A tangible, non-transitory, computer-readable medium storing instructions executable by at least one processor in a computing device, wherein the instructions comprise instructions to:
- determine, using the at least one processor, a location and an orientation of the computing device with respect to physical features in a facility, wherein the physical features comprise a first industrial automation equipment that is at least partially blocked from view of an image sensor of the computing device at the location and the orientation by a physical obstruction disposed between the image sensor and the first industrial automation equipment, and wherein the location and the orientation are determined by:
    - determining identities of one or more of the physical features based at least in part on image data captured by the image sensor;
    - determining physical dimensions of the one or more of the physical features based at least in part on the identities of the one or more of the physical features; and
    - determining the location and the orientation of the computing device based at least in part on depiction of the physical dimensions of the one or more of the physical features in the image data;
- instruct, using the at least one processor, the computing device to display a plurality of real objects based at least in part on the image data captured by the image sensor of the computing device, wherein the plurality of real objects comprises an obstructing real object depicting the physical obstruction in response to the image sensor of the computing device being oriented toward the first industrial automation equipment;
- instruct, using the at least one processor, the computing device to modify the obstructing real object into an outline of the physical obstruction to present a first virtual object depicting a component of the first industrial automation equipment within the outline, wherein the first virtual object is generated based at least in part on operational parameter data received from the component and is configured to reveal a representation of the component through the outline of the physical obstruction within the image data; and
- instruct, using the at least one processor, the computing device to display a second virtual object superimposed on at least a portion of the plurality of real objects, wherein the second virtual object is generated in response to the computing device being moved within a threshold distance from the first industrial automation equipment and the image sensor of the computing device being oriented toward the first industrial automation equipment, and wherein the second virtual object is configured to visually indicate the operational parameter data associated with the component of the first industrial automation equipment and is displayed adjacent to the first virtual object.

14. The computer-readable medium of claim 13, comprising instructions to receive the physical dimensions of the one or more of the physical features from the first industrial automation equipment.

15. The computer-readable medium of claim 13, comprising instructions to receive additional image data from another computing device or the first industrial automation equipment based at least in part on the location and the orientation of the computing device, wherein the plurality of real objects is displayed using the additional image data.

16. The computer-readable medium of claim 13, wherein the plurality of real objects comprises a second real object depicting second industrial automation equipment in response to the image sensor of the computing device being oriented toward the second industrial automation equipment; and
comprising additional instructions to instruct, using the at least one processor, the computing device to display a third virtual object superimposed on at least a portion of the plurality of real objects in response to the computing device being moved within the threshold distance from the second industrial automation equipment and the image sensor of the computing device being oriented toward the second industrial automation equipment, wherein the third virtual object presents a set of relevant information related to the second industrial automation equipment and is displayed adjacent to the second real object.

17. A method, comprising:
displaying, using a display component of a computing device in an industrial automation system, an obstructing real object that depicts a physical obstruction disposed between industrial automation equipment and an image sensor of the computing device based at least in part on image data captured by the image sensor in response to the image sensor being oriented toward the industrial automation equipment, wherein at least a portion of the industrial automation equipment is blocked from view of the image sensor by the physical obstruction;
modifying, using the display component, the obstructing real object into an outline of the physical obstruction to present a first virtual object that depicts the industrial automation equipment within the outline, wherein the first virtual object is generated based at least in part on one or more operational parameters transmitted by one or more sensors associated with the industrial automation equipment, and wherein the real object is configured to reveal a representation of the industrial automation equipment through the outline of the physical obstruction within the image data;
displaying, using the display component, a second virtual object that visually indicates at least a portion of the operational parameters of the industrial automation equipment superimposed on at least a portion of the first virtual object, wherein the second virtual object is generated in response to the computing device being moved within a threshold distance from the industrial automation equipment and the image sensor of the computing device being oriented toward the industrial automation equipment; and determining, using a processor of the computing device, one or more procedure instructions, assessment information, or both based at least in part on the real object and the virtual object, wherein the one or more procedure instructions are configured to be executed to perform an operation in the industrial automation system and the assessment information comprises one or more recommendations to adjust the industrial automation system.

18. The method of claim 17, wherein determining the one or more procedure instructions, the assessment information, or both comprises:
   transmitting, using a communication component of the computing device, the image data to another computing device associated with a user physically remote from a facility that includes the industrial automation equipment; and
   receiving, using the communication component, the procedure instructions, the assessment information, or both from the another computing device.

19. The method of claim 17, wherein displaying the second virtual object comprises displaying the second virtual object to indicate potential replacement parts to use in the industrial automation equipment in response to the industrial automation equipment having an obsolete status, and wherein the assessment information comprises the obsolete status.

20. The method of claim 17, comprising determining, using the processor, a location and an orientation of the computing device by:
   determining, using the processor, identities of one or more physical features including the industrial automation equipment based at least in part on the image data captured by the image sensor of the computing device;
   determining, using the processor, physical dimensions of the one or more of the physical features based at least in part on the identities of the one or more of the physical features; and
   determining, using the processor, the location and the orientation of the computing device based at least in part on depiction of the physical dimensions of the one or more of the physical features in the image data.

* * * * *